(12) United States Patent
Oh et al.

(10) Patent No.: US 11,203,003 B2
(45) Date of Patent: Dec. 21, 2021

(54) METHOD OF PREPARING CARBON AEROGEL PRECURSOR, CARBON AEROGEL PRECURSOR PREPARED THEREBY, AND CARBON AEROGEL

(71) Applicant: KOREA INSTITUTE OF MACHINERY & MATERIALS, Daejeon (KR)

(72) Inventors: Young Seok Oh, Gimhae-si (KR); Kang Eun Lee, Changwon-si (KR); Jin Woo Lee, Changwon-si (KR); Moon Kwang Um, Changwon-si (KR)

(73) Assignee: KOREA INSTITUTE OF MATERIALS SCIENCE, Changwon-si (KR)

( * ) Notice: Subject to any disclaimer, the term of this patent is extended or adjusted under 35 U.S.C. 154(b) by 302 days.

(21) Appl. No.: 16/469,709

(22) PCT Filed: Jun. 19, 2017

(86) PCT No.: PCT/KR2017/006409
§ 371 (c)(1),
(2) Date: Jun. 14, 2019

(87) PCT Pub. No.: WO2017/217832
PCT Pub. Date: Dec. 21, 2017

(65) Prior Publication Data
US 2020/0330947 A1    Oct. 22, 2020

(30) Foreign Application Priority Data
Jun. 17, 2016 (KR) .................. 10-2016-0075610

(51) Int. Cl.
*C01B 31/02* (2006.01)
*B01J 13/00* (2006.01)
*C01B 32/05* (2017.01)
*C01B 32/158* (2017.01)
*C01B 32/198* (2017.01)

(52) U.S. Cl.
CPC ....... *B01J 13/0091* (2013.01); *B01J 13/0065* (2013.01); *C01B 32/05* (2017.08); *C01B 32/158* (2017.08); *C01B 32/198* (2017.08)

(58) Field of Classification Search
CPC ............................ C01B 32/158; C01B 32/198
See application file for complete search history.

(56) References Cited

U.S. PATENT DOCUMENTS

2010/0092371 A1    4/2010 Backov et al.

FOREIGN PATENT DOCUMENTS

| KR | 10-1427731 | 9/2014 |
|---|---|---|
| WO | 2015/109272 | 7/2015 |

OTHER PUBLICATIONS

Nabeta, 'Nanotube Foam Prepared by Gelatin Gel as a Template' in Langmuir vol. 21 pp. 1706-1708 2005. (Year: 2005).*
Haisong Qi et al., "Electrically conductive aerogels composed of cellulose and carbon nanotubes", Journal of Materials Chemistry A, vol. 1, pp. 9714-9720, 2013.
Pin Hao et al., "Hierarchical porous carbon aerogel derived from bagasse for high performance supercapacitor electrode", Nanoscale, vol. 6, pp. 12120-12129, 2014.

* cited by examiner

*Primary Examiner* — Stuart L Hendrickson
(74) *Attorney, Agent, or Firm* — Lex IP Meister, PLLC

(57) ABSTRACT

The present invention relates to a carbon aerogel precursor, a preparation method thereof and a carbon aerogel prepared thereby and, more particularly, to a carbon aerogel precursor which can be converted into a carbon aerogel that exhibits excellent specific surface area and physical properties by using a binder that has a low carbonization ratio and is capable of performing phase conversion while using a carbon material having physical properties such as diameter, length and the like that are not adjusted, a preparation method thereof, and a carbon aerogel prepared thereby.

18 Claims, 26 Drawing Sheets

METHOD OF PREPARING CARBON AEROGEL PRECURSOR, CARBON AEROGEL PRECURSOR PREPARED THEREBY, AND CARBON AEROGEL

BACKGROUND OF THE INVENTION

Field of the Invention

The present invention relates to a carbon aerogel precursor, a preparation method thereof and a carbon aerogel prepared thereby and, more particularly, to a carbon aerogel precursor which can be converted into a carbon aerogel that exhibits excellent specific surface area and physical properties by using a binder that has a low carbonization ratio and is capable of performing phase conversion while using a carbon material having physical properties such as diameter, length and the like that are not adjusted, a preparation method thereof, and a carbon aerogel prepared thereby.

Related Art

An aerogel was primally prepared in 1932 by Steven Kistler, and the aerogel was obtained by substituting gas for liquid without causing contraction in a jelly. It was a silica gel that has primally been prepared. The aerogel could have been prepared from various materials, and Kistler had used silica, aluminum, chromium, tin and the like to prepare the aerogel.

A carbon aerogel was primally developed in the early nineteen hundreds. The carbon aerogel as a porous material mainly having mesopores is material which is used as an electrode for super capacitor, a water treatment electrode for capacitive deionization technology (CDI), or the like.

It is general that the carbon aerogel is synthesized by heat-treating (carbonizing) the organic aerogel after preparing an organic aerogel by firstly using an organic precursor in order to prepare such a carbon aerogel. The organic aerogel has a big advantage of facilitating product handling since the organic aerogel is mechanically flexible compared to conventional silica aerogels and oxide aerogels, and has inelasticity (viscoelasticity) characteristics with respect to an external applied force.

The carbon aerogel synthesized from the organic aerogel can be applied as an electrode due to development of a pore structure having unique characteristics, excellent electrical conductivity and high specific surface area coming from a carbon material as well as an advantage in mechanical property of the organic aerogel.

A carbon aerogel electrode facilitates accessibility of a target material by maintaining a pore structure larger than an activated carbon electrode since pores developed inside the carbon aerogel electrode are in a mesopore size range of 2 to 50 nm. Therefore, the carbon aerogel electrode may exhibit very excellent electrode performance in spite of a small specific surface area compared to activated carbon.

However, a carbon aerogel which has been developed up to now can be prepared into an aerogel only when length and diameter of the carbon material should be finely adjusted. Therefore, preparation costs of the carbon aerogel have been high, and it has been difficult to commercialize the carbon aerogel. Further, there have conventionally been problems in such a carbon aerogel synthesized from the organic aerogel that conductivity of the carbon aerogel was weak, and pore characteristics were not well observed by the aerogel. Moreover, in order to utilize the carbon aerogel as an electrode material, the carbon aerogel should satisfy properties such as large specific surface area, low internal resistance of the material itself, high density of the carbon material, and the like.

Accordingly, the present inventors have completed the present invention by suggesting a method of preparing a new carbon aerogel which can sufficiently exhibit pore characteristics while maintaining high conductivity by the above-mentioned properties, and a carbon aerogel prepared thereby.

SUMMARY OF THE INVENTION

In order to solve the above-mentioned problems of conventional technique, an objective of the present invention is to provide a method of preparing a carbon aerogel precursor, the method which can prepare a new carbon aerogel in various forms in excellent workability, the new carbon aerogel that is capable of sufficiently exhibiting pore characteristics while maintaining high conductivity by enabling phase conversion into a liquid phase or a solid phase from a carbon material having physical properties such as diameter, length and the like that are not adjusted.

Furthermore, another objective of the present invention is to provide a carbon aerogel precursor prepared by the preparation method of the present invention.

Furthermore, another objective of the present invention is to provide a carbon aerogel prepared using a carbon aerogel precursor prepared by the preparation method of the present invention.

Furthermore, another objective of the present invention is to provide a method of producing a carbon aerogel graphene composite by the present invention.

In order to achieve the objectives of the present invention, the present invention provides a method of preparing a carbon aerogel precursor, the method comprising the steps of: mixing a carbon material and a dispersant with a solvent to prepare a carbon material dispersion; adjusting concentration of the carbon material dispersion; mixing a binder with the carbon material dispersion to provide a mixed solution; and dispersing the mixed solution to obtain a gelated mixed solution.

It is possible that a method of preparing a carbon aerogel precursor according to the present invention further comprises the step of dipping the gelated mixed solution in ethanol to remove the dispersant.

In a method of preparing a carbon aerogel according to the present invention, if the carbon material includes carbon materials that are known to those skilled in the art, the carbon material may include the carbon materials without limitation. Specifically, the carbon material are preferably selected from the group consisting of micro- and nano-carbon materials including a carbon nanotube, a graphene, an oxide graphene, and a carbon fiber. A method of preparing a carbon aerogel according to the present invention has a technical feature that a carbon aerogel exhibiting a high specific surface area porosity can be prepared although a crude carbon material of which physical properties are not adjusted is used.

In a method of preparing a carbon aerogel precursor according to the present invention, the carbon material has a diameter of 0.8 nm or more and a length of 100 nm or more. An aerogel with desired physical properties could be prepared only when length and diameter of the carbon material should be adjusted within specific ranges to which van der Waals force between carbon materials is well applied in order to generally prepare a conventional aerogel. However, a method of preparing a carbon aerogel precursor according to the present invention can prepare a carbon aerogel precursor which is converted into a high quality carbon aerogel even without using a carbon material of which length and diameter are not adjusted.

In a method of preparing a carbon aerogel according to the present invention, a concentration of the carbon material with respect to a carbon material dispersion comprising the carbon material is 0.001 to 30 wt %.

In a method of preparing a carbon aerogel precursor according to the present invention, the step of adjusting the concentration of the carbon material dispersion comprises performing a centrifugation process to separate and remove a supernatant or evaporate the solvent. In a method of preparing a carbon aerogel precursor according to the present invention, although the concentration of the carbon material dispersion is lowered during an initial mixing process such that the carbon material is well dispersed in the solvent, the concentration of the carbon material dispersion is adjusted after the initial mixing process such that a gelation process is well performed by evaporating the solvent, thereby increasing the concentration of the carbon material dispersion. A method of preparing a carbon aerogel precursor according to the present invention can secure mechanical and electrical physical properties of a carbon aerogel precursor prepared during conversion of the carbon aerogel thereafter by forming a continuous network structure between carbon nanomaterials through concentration adjustment of the carbon material dispersion. Namely, in a method of preparing a carbon aerogel precursor according to the present invention, a critical temperature of phase change in a precursor state can be adjusted according to concentration of the carbon material of the mixed solution.

In a method of preparing a carbon aerogel according to the present invention, the solvent may be water or an organic solvent, and the organic solvent is methyl alcohol (MeOH), ethyl alcohol (EtOH), propyl alcohol (PA), isopropyl alcohol (IPA), butanol (BA), ethylene glycol (EG), 1,2-dichlorobenzene, dimethyl formamide (DMF), dimethyl acetamide (DMAc), methyl ethyl ketone (MEK), methyl isobutyl ketone (MIBK), butyl cellosolve (BC), butyl cellosolve acetate (BCA), n-methyl-2-pyrrolidone (NMP), ethyl acetate (EA), butyl acetate (BA), acetone, cyclohexanone, or toluene.

In a method of preparing a carbon aerogel according to the present invention, the dispersant is an anionic dispersant, a cationic dispersant or a nonionic dispersant, and the anionic dispersant is selected from the group consisting of sodium dodecyl sulfate (SDS), lithium dodecyl sulfate (LDS), sodium dodecyl sulfate (NaDDS), sodium dodecyl sulfonate (SDSA) and sodium dodecylbenzene sulfonate (SDBS) that are alkyl sulfate-based compounds.

The cationic dispersant is selected from the group consisting of cetyltrimethyl ammonium chloride (CTAC), cetyltrimethyl ammonium bromide (CTAB), and dodecyltrimethyl ammonium bromide (DTAB).

The nonionic dispersant is selected from the group consisting of glycerol monostearate, sorbitan monooleate, Tween 80, polyvinyl alcohol (PVA), polymethyl acrylate (PMA), methyl cellulose (MC), carboxyl methyl cellulose (CMC), Gum Arabic (GA), polysaccharide (dextrin), polyethyleneimine (PEI), polyvinylpyrrolidone (PVP), and polyethylene oxide (PEO)-poly(ethylene oxide)-poly(butylene oxide) terpolymer.

In a method of preparing a carbon aerogel according to the present invention, the step of adjusting the concentration of the carbon material dispersion comprises adjusting the concentration of the carbon material dispersion to 0.001 to 30 wt %. In a method of preparing a carbon aerogel according to the present invention, phase conversion can be performed from a liquid phase to a solid state via a gel state by adjusting the concentration of the carbon material dispersion, and a finally prepared carbon aerogel can secure mechanical and electrical properties by forming a continuous network structure between the carbon nanomaterials.

In a method of preparing a carbon aerogel according to the present invention, if the binder includes materials of which phase change occurs from a solid phase to a liquid phase depending on temperature of the binder, the materials can be freely used without limitation.

In a method of preparing a carbon aerogel precursor according to the present invention, if the binder includes materials of which phase change occurs from a solid phase to a liquid phase depending on temperature of the binder, the materials can be freely used without limitation. In a method of preparing a carbon aerogel according to the present invention, the binder is gelatin, cellulose or chitosan. In a method of preparing a carbon aerogel precursor according to the present invention, it is preferable that the binder is specifically gelatin, chitosan, or cellulose selected from the group consisting of methyl cellulose, ethyl cellulose, ethyl methyl cellulose, hydroxyethyl cellulose, hydroxypropyl cellulose, methyl hydroxyethyl cellulose, ethyl hydroxyethyl cellulose, hydroxypropyl methyl cellulose, carboxymethyl cellulose, and mixtures thereof. Polymers exhibiting upper critical solution temperature (UCST) behaviors can be also freely used without limitation.

In a method of preparing a carbon aerogel according to the present invention, the polymer may include a lower critical solution temperature (LCST) polymer or an upper critical solution temperature (UCST) polymer. The LCST polymer and the UCST polymer are polymers which are each dissolved in a solvent at low temperatures and increased temperatures, and which are deposited from a solution as a separated phase when dissolved polymers each reach a lower critical solution temperature (LCST) and an upper critical solution temperature (UCST) as the temperatures are each increased and decreased. For example, such polymers are disclosed in a document ["Polymers", H. G. Elias, Huthig and Wepf-Verlag, Zug, 1996, on pages 183 ff.].

Examples of appropriate LCST polymer and UCST polymer for the present invention include polyalkylene oxide derivatives, preferably include polyethylene oxide (PEO) derivatives, polypropylene oxide (PPO) derivatives, PPO-PEO block copolymers modified by olefin, acrylate-modified PEO-PPO-PEO 3-block copolymers, poly(methyl vinyl ether), poly(N-vinyl caprolactam), ethyl(hydroxyethyl) cellulose, poly(N-isopropylacrylamide), and polysiloxane. Particularly, examples of the appropriate UCST polymer include polystyrene, a polystyrene copolymer, and a polyethylene oxide copolymer.

In a method of preparing a carbon aerogel precursor according to the present invention, the binder is mixed in an amount of 50 to 300 parts by weight per the total weight of the carbon material dispersion of 100 parts by weight. In a method of preparing a carbon aerogel according to the present invention, phase change does not occur freely when the binder is mixed in an amount of less than 50 parts by weight, and the formation of the carbon aerogel is not additionally affected when the binder is mixed in an amount of 300 parts by weight or more.

In a method of preparing a carbon aerogel precursor according to the present invention, when gelatin is used as the binder, the gelatin is first dissolved in a solvent to prepare a gelatin solution. This is a step for preparing a mixed solution by dissolving the gelatin in the solvent. Specifically, the solvent may be water. Specifically, the step of preparing the gelatin solution by dissolving the gelatin in the solvent may comprise performing a pre-treatment process of adding the gelatin to water and soaking the gelatin in water at room temperature for about 30 minutes to 1 hour.

After the step of preparing the gelatin solution, a stirring process may be additionally performed for a predetermined time to effectively mix the gelatin with the solvent. For instance, the gelatin may be effectively mixed with the solvent by performing the stirring process at room temperature for about 2 to 4 hours.

In the step of preparing the gelatin solution by dissolving the gelatin in the solvent, 20 to 50 wt % of the gelatin may be contained in the gelatin solution. More specifically, 30 to 35 wt % of the gelatin may be contained in the gelatin solution. When the gelatin is contained within the above-mentioned amount range, the gelatin may have viscosity and physical properties that are capable of facilitating addition of the carbon material and dispersant to the mixed solution or dispersion of the carbon material and dispersant in the mixed solution, and the amount of doped nitrogen derived from the gelatin in a carbon aerogel produced thereafter may be controlled to an appropriate level.

In a method of preparing a carbon aerogel precursor according to the present invention, the step of obtaining the mixed solution in a gel-converted form by dispersing a mixed solution obtained by mixing the carbon material with the binder enables the mixed solution to be dispersed by stirring the mixed solution while applying ultrasonic waves to the mixed solution.

A carbon aerogel precursor according to the present invention is characterized in that phase change of the carbon aerogel precursor is reversibly occurred from a liquid phase to a solid phase via a gel conversion according to temperature. A carbon aerogel precursor according to the present invention is characterized in that phase change of the carbon aerogel precursor is reversibly converted from the liquid phase to the solid phase according to phase change of the gelatin added as the binder. According as phase conversion of a carbon aerogel precursor according to the present invention to the liquid phase and the solid phase can be performed as described above, the present invention exhibits an effect that is capable of preparing a carbon aerogel in a desired shape by forming the carbon aerogel precursor in a liquid phase by a desired method such as spraying or the like, lowering temperature of the carbon aerogel precursor formed in the liquid phase to obtain a gelated carbon aerogel precursor, and then heat-treating the gelated carbon aerogel precursor.

A method of preparing a carbon aerogel precursor according to the present invention can further comprise the step of removing the dispersant by dipping the mixed solution obtained in a gel phase in ethanol.

A carbon aerogel precursor according to the present invention can be produced into a carbon aerogel by forming the mixed solution obtained in the gel phase in a desired shape using a forming frame or the like, dipping the mixed solution having a formed shape in ethanol to remove the dispersant, and then performing a drying process and a carbonization process. A carbon aerogel precursor according to the present invention not only can perform phase change to the liquid phase and the solid phase by the binder added, but also can be adjusted to exhibit appropriate concentration and viscosity by adjusting concentration of the dispersion solvent through evaporation or the like of a dispersion solvent. Therefore, the carbon aerogel precursor according to the present invention exhibits an effect that the precursor can be diversely formed according to a desired form of the carbon aerogel.

A carbon aerogel precursor prepared by the preparation method according to the present invention means a state that the solvent is dispersed between carbon structures, and the carbon aerogel precursor can be changed into a carbon aerogel by heat treatment and carbonization. A carbon aerogel precursor according to the present invention includes a carbon material having a diameter of 0.8 nm or more and a length of 100 nm or more. Preferably, the carbon aerogel precursor according to the present invention includes a carbon material having a diameter of 0.7 nm or more and a length of 100 nm or more.

Furthermore, the present invention provides a method of preparing a carbon aerogel using a carbon aerogel precursor prepared by the present invention, and an a carbon aerogel prepared thereby.

A method of preparing a carbon aerogel according to the present invention comprises the steps of: preparing a carbon material dispersion by mixing a carbon material and a dispersant with a solvent; adjusting concentration of the carbon material dispersion; providing a mixed solution by mixing a binder with the carbon material dispersion; obtaining a gel type carbon aerogel precursor in a gel form by dispersing the mixed solution; removing the dispersant and obtaining a dispersant-removed carbon aerogel precursor by dipping the carbon aerogel precursor in ethanol; and drying the dispersant-removed carbon aerogel precursor to obtain a dried carbon aerogel.

A method of preparing a carbon aerogel according to the present invention can further comprise a step of heat-treating the dried carbon aerogel to carbonize the carbon material and the binder.

A method of preparing a carbon aerogel according to the present invention comprises the step of performing a drying process and/or the step of performing a carbonization process after performing the process of preparing a carbon aerogel precursor according to the present invention.

In a method of preparing a carbon aerogel according to the present invention, the step of heat-treating the dried carbon aerogel to carbonize the carbon material and the binder is performed at a temperature of 500 to 2,400° C.

In a method of preparing a carbon aerogel according to the present invention, the step of heat-treating the dried carbon aerogel to carbonize the carbon material and the binder comprises carbonizing the carbon material and the binder through a process of heat-treating a carbon aerogel precursor including the carbon material and the binder at a temperature of 500 to 2,400° C. in an atmosphere of an inert gas such as Ar or $N_2$.

In a method of preparing a carbon aerogel according to the present invention, when a heat treatment process is performed at relatively high temperatures, ratio of nitrogen atom in a carbon aerogel prepared by performing the heat treatment process at relatively low temperatures is lowered.

Furthermore, the present invention provides a carbon aerogel prepared by the preparation method of the present invention. Further, a carbon aerogel according to the present invention includes an aerogel in a state that an inner solvent is substituted by air while maintaining a state that the carbon material and the binder obtained by performing up to the drying process are not carbonized as well as a carbon aerogel in a state that the carbon material and the binder produced after the step of performing a carbonization process are carbonized.

A carbon aerogel prepared by the preparation method of the present invention includes carbon particles coated on the surface of the carbon material which forms a structure. A carbon aerogel according to the present invention is coupled to the surface of carbon particles produced as gelatin or the like used as the binder is carbonized in the heat treatment step. A carbon aerogel according to the present invention exhibits an effect that specific surface area, conductivity and mechanical properties are greatly improved by the carbon particles of which surfaces are carbonized as described above.

To this end, the binder has a carbonization ratio of 5 to 40% during carbonization in a method of preparing a carbon aerogel according to the present invention. In a method of preparing a carbon aerogel according to the present invention, the binder is not carbonized as much as 100% since the binder has the carbonization ratio of 5 to 40%, and mechanical properties, electrical conductivity and thermal conductivity of the aerogel can be additionally adjusted since the binder is attached to or precipitated on the surface of the carbon material while the binder is being carbonized to a low carbonization ratio of the aerogel in the heat treatment process.

A carbon aerogel according to the present invention includes a carbon material having a diameter of 0.8 nm or more and a length of 100 nm or more. More preferably, a carbon aerogel according to the present invention includes a carbon material having a diameter of 0.7 nm or more and a length of 100 nm or more.

A carbon aerogel according to the present invention has a specific surface area of 2,000 $m^2/g$ or more. A carbon aerogel according to the present invention exhibits an effect that the binder further increases specific surface area of the carbon aerogel while a binder added is being precipitated and coated on the surface of the aerogel in the carbonization process.

A carbon aerogel according to the present invention exhibits an effect that a binder coated on the surface of a carbon nanomaterial further increases specific surface area of the carbon aerogel through the carbonization process. At this time, specific surface area and conductivity of the carbon aerogel can be adjusted according to a carbonization ratio of the binder. The carbonization ratio of the binder is 30% or less and may be in a range of 5 to 30% in a temperature range of 400 to 1,000° C., and the carbonization ratio of the binder according to temperature and specific surface area, electrical conductivity and mechanical properties of the carbon aerogel prepared according to crystallinity may be adjusted.

A carbon aerogel according to the present invention has a pore volume of 1.5 cc/g or more. A carbon aerogel according to the present invention has a pore volume of 3.44 cc/g or more when performing the carbonization process using gelatin as the binder in the carbon material, and the carbon aerogel according to the present invention enables a large pore volume to be formed compared to general activated carbon having a pore volume of 0.8 cc/g.

A carbon aerogel according to the present invention has a hierarchical distribution consisting of micropores and mesopores. Namely, a carbon aerogel according to the present invention has a bimodal pore size distribution including first pores having an average pore size of 2 nm and second pores having an average pore size range of 2 nm or more.

A carbon aerogel according to the present invention is doped with nitrogen, and a nitrogen doping ratio of the carbon aerogel is 0.001 to 0.1 of an atomic ratio of nitrogen to the carbon atom.

A structure of which pore size distribution and specific surface area are improved may be manufactured by adding gelatin or the like as the binder to a carbon aerogel according to the present invention, thereby forming appropriate bonding type and ratio between carbon and nitrogen of the gelatin, i.e., a carbon material precursor within the nitrogen atomic ratio range during the carbonization process.

In a method of preparing a carbon aerogel precursor or an aerogel according to the present invention, the step of providing the mixed solution by mixing the binder with the carbon material dispersion can further comprise additionally mixing a carbon precursor. Furthermore, a method of preparing a carbon aerogel according to an embodiment of the present invention may comprise the steps of: preparing a carbon material dispersion by mixing a carbon material and a dispersant with a solvent; adjusting concentration of the carbon material dispersion; providing a mixed solution by mixing a binder with the carbon material dispersion; obtaining a gel type carbon aerogel precursor by dispersing the mixed solution; removing the dispersant and obtaining a dispersant-removed carbon aerogel precursor by dipping the carbon aerogel precursor in ethanol; and obtaining a dried carbon aerogel by drying the dispersant-removed carbon aerogel precursor. The method of preparing the carbon aerogel according to an embodiment of the present invention can further comprise the step of carbonizing the carbon material and the binder by heat-treating the dried carbon aerogel.

In a method of preparing a carbon aerogel according to the present invention, the carbon precursor may be one or more selected from the group consisting of (i) a saccharide selected from the group consisting of a monosaccharide, a disaccharide, an oligosaccharide, derivatives thereof, and a random combination thereof, (ii) a polymer carbohydrate, derivatives of the polymer carbohydrate, a non-carbohydrate synthetic polymer or a random combination thereof, and polydopamine, or may be a monosaccharide selected from the group consisting of glucose, fructose, hydrates thereof, syrups thereof and combinations thereof, or a polysaccharide selected from the group consisting of maltose, sucrose, hydrates thereof, syrups thereof, and combinations thereof.

In a method of preparing a carbon aerogel according to the present invention, the carbon precursor has a concentration of 0.01 to 5 M and may be additionally mixed in an amount ratio of 0.1 to 1,000 parts by weight per 100 parts by weight of the carbon material dispersion.

Furthermore, the present invention may provide a carbon aerogel graphene composite produced by using the carbon aerogel precursor and the oxide graphene, and a method of producing the same.

A method of producing a carbon aerogel graphene composite produced by using the carbon aerogel precursor and the oxide graphene according to the present invention comprises the steps of: obtaining a gelated carbon aerogel precursor; mixing a graphene oxide with the carbon aerogel precursor to prepare a mixed solution; performing a spinning process of the mixed solution, thereby spinning the mixed solution to manufacture a nanofiber; and heat-treating the nanofiber.

The step of obtaining the gelated carbon aerogel precursor may be performed by the above-described method.

The step of obtaining the gelated carbon aerogel precursor may comprise the steps of: preparing a carbon material dispersion by mixing a carbon material and a dispersant with a solvent; providing a mixed solution by mixing a binder with the carbon material dispersion; and obtaining the gelated carbon aerogel precursor by dispersing the mixed solution.

The step of obtaining the gelated carbon aerogel precursor may further comprise a step of adjusting concentration of the carbon material dispersion after performing the step of preparing the carbon material dispersion by mixing the carbon material and the dispersant with the solvent.

Further, the step of providing the mixed solution by mixing the binder with the carbon material dispersion can comprise additionally mixing a carbon precursor with the carbon material dispersion.

In a method of manufacturing a carbon aerogel graphene composite nanofiber according to the present invention, the carbon precursor is (i) a saccharide selected from the group consisting of a monosaccharide, a disaccharide, an oligosaccharide, derivatives thereof, and a random combination thereof, and (ii) a polymer carbohydrate, derivatives of the polymer carbohydrate, a non-carbohydrate synthetic polymer, or a random combination thereof.

In a method of manufacturing a carbon aerogel graphene composite nanofiber according to the present invention, the carbon precursor is adhered to the surface of the carbon material while the carbon precursor is being carbonized by a wet spinning process and a heat treatment process after a carbon precursor added has been dispersed on the surface of the carbon material. A method of manufacturing a carbon aerogel graphene composite nanofiber according to the present invention may increase conductivity and specific surface area by adding the carbon precursor that can be carbonized by heat treatment.

A method of manufacturing a carbon aerogel graphene composite nanofiber according to the present invention comprises steps of mixing a graphene oxide with the carbon aerogel precursor to obtain a mixed solution, and spinning the mixed solution through a spinning process to manufacture a nanofiber. It is preferable to mix the graphene oxide at an amount ratio of 50 to 200 parts by weight per 100 parts by weight of the carbon aerogel precursor.

Graphene as an artificial nanomaterial can transmit electric current at least 100 times faster than copper or silicon per unit area due to electron configuration of a hexagonal carbon structure, exhibits excellent properties also in thermal conductivity and mechanical strength compared to other materials, and is excellent in elasticity such that the graphene has excellent characteristics of maintaining electrical conductivity even in case of various shaped deformations.

In a method of manufacturing a carbon aerogel graphene composite nanofiber according to the present invention, the spinning process is preferably performed through an electrospinning process, a wet spinning process or a mechanical spinning process. Such a method of manufacturing a carbon aerogel graphene composite nanofiber according to the present invention has a great advantage that it can be applied to an existing fiber spinning system. Namely, a method of manufacturing a carbon aerogel graphene composite nanofiber according to the present invention has a very economical advantage since the carbon aerogel graphene composite nanofiber can be manufactured such that the method is easily grafted onto the continuous process of the existing fiber spinning system since the method comprises processes of passing a mixed solution of a graphene oxide and a precursor during a continuous process of fiber spinning, drying the mixed solution with hot air to obtain a dried mixed solution, and thermally carbonizing the dried mixed solution.

If the spinning process is the wet spinning process, the carbon aerogel graphene composite nanofiber can be manufactured by filling the mixed solution in a wet spinning device, and applying a mechanical force to a gear pump of the wet spinning device, thereby discharging the mixed solution. At this time, diameter of the carbon aerogel graphene composite nanofiber that is formed can be adjusted by adjusting traction ratio and stretching ratio using the wet spinning device.

If the spinning process is the electrospinning process, the carbon aerogel graphene composite nanofiber can be manufactured by filling the mixed solution in an electrospinning device, and discharging the mixed solution through electrical pressure of the electrospinning device. At this time, diameter of the carbon aerogel graphene composite nanofiber that is formed can be adjusted by adjusting an applying voltage of the electrospinning device and distance between a nozzle and a collection plate.

In a method of manufacturing a carbon aerogel graphene composite nanofiber according to the present invention, the heat treatment process is performed at a temperature of 500 to 2,400° C.

In a method of manufacturing a carbon aerogel graphene composite nanofiber according to the present invention, the step of heat-treating the dried carbon aerogel to carbonize the carbon material, the binder and the carbon precursor comprises carbonizing the carbon material, the binder and the carbon precursor through a process of heat-treating a carbon aerogel precursor including the carbon material, the binder and the carbon precursor at a temperature of 500 to 2,400° C. in an atmosphere of an inert gas such as Ar or $N_2$.

A method of manufacturing a carbon aerogel graphene composite nanofiber according to the present invention can additionally adjust mechanical properties, electrical conductivity and thermal conductivity of a carbon aerogel graphene composite nanofiber manufactured since the binder and the carbon precursor are attached to or precipitated on the surface of the aerogel in the heat treatment process.

The binder and the carbon precursor have a carbonization ratio of 5 to 40% during carbonization in a method of manufacturing a carbon aerogel graphene composite nanofiber according to the present invention. In a method of manufacturing a carbon aerogel graphene composite nanofiber according to the present invention, the binder is not carbonized as much as 100% since the binder has the carbonization ratio of 5 to 40%, and mechanical properties, electrical conductivity and thermal conductivity of the aerogel can be additionally adjusted since the binder is attached to or precipitated on the surface of the carbon material while the binder is being carbonized to a low carbonization ratio of the aerogel in the heat treatment process.

Furthermore, the present invention provides a carbon aerogel graphene composite nanofiber including surface wrinkles formed in the longitudinal direction. A carbon aerogel graphene composite nanofiber including surface wrinkles formed in the longitudinal direction according to the present invention is characterized in that the surface wrinkles formed in the longitudinal direction are communicated with the inside of the nanofiber.

A carbon aerogel graphene composite nanofiber according to the present invention has an electrical conductivity of 10 to 1,000 s/cm.

A carbon aerogel graphene composite nanofiber according to the present invention has a diameter of 10 to 100 μm. The diameter of a carbon aerogel graphene composite nanofiber according to the present invention is adjusted in the spinning process during the manufacturing process.

A carbon aerogel graphene composite nanofiber according to the present invention is doped with nitrogen, and a nitrogen doping ratio of the carbon aerogel graphene composite nanofiber is 0.001 to 0.2 of an atomic ratio of nitrogen to the carbon atom.

Furthermore, the present invention provides an electrochemical device including a carbon aerogel or a carbon aerogel graphene composite nanofiber according to the present invention as an electrode.

An electrochemical device according to the present invention may include a super capacitor, an electric double layer capacitor, a secondary battery, and the like.

DESCRIPTION OF EXEMPLARY EMBODIMENTS

Hereinafter, the present invention will be described more in detail by examples. However, the present invention is not limited by the following examples.

[Preparation 1 of Carbon Aerogel Precursors and Carbon Aerogels]

Preparation of a CNT Dispersion

After adding sodium dodecylbenzene sulfonate (SDBS) as a dispersant to distilled water as a dispersion medium to obtain a mixed solution, a carbon nanotube was uniformly dispersed in the mixed solution at a ratio of 0.5 wt %.

After applying ultrasonic waves to a mixed solution of the carbon nanotube and a solvent and dispersing the carbon nanotube in the solvent for 2 hours to obtain a carbon nanotube dispersion, a centrifugation process of the carbon nanotube dispersion was performed to separate a supernatant from the carbon nanotube dispersion.

A carbon nanotube dispersion was prepared by evaporating the solvent from the separated supernatant, thereby adjusting concentration of the carbon nanotube dispersion to 1.0 wt %.

Preparation of a Gelatin Solution

After mixing 3 mg of gelatin with 1 ml of distilled water, a gelatin solution was prepared by stirring the gelatin in the water until the gelatin was fully dissolved in the water at about 50° C.

Preparation and Gelation of a CNT-Gelatin Mixed Solution

The previously prepared gelatin solution was mixed with the previously prepared CNT dispersion to obtain mixed solutions. At this time, mixing ratios of the CNT dispersion and the gelatin solution are shown in the following table 1.

TABLE 1

|  | CNT dispersion:Gelatin solution |
| --- | --- |
| Example 1 | 1:2 |
| Example 2 | 1:1 |
| Example 3 | 2:1 |

Then, gelated CNT-gelatin mixed solutions in the form of a jelly were obtained by uniformly dispersing the gelatin solution in the CNT dispersion while applying ultrasonic waves to the mixed solutions to obtain CNT-gelatin mixed solutions, and leaving alone the CNT-gelatin mixed solutions at temperatures including room temperature, 3° C. and 60° C. for 1 hour, thereby gelating the CNT-gelatin mixed solutions.

<Experimental Example> Phase Change Analysis of CNT-Gelatin Mixed Solutions

Figure 1:
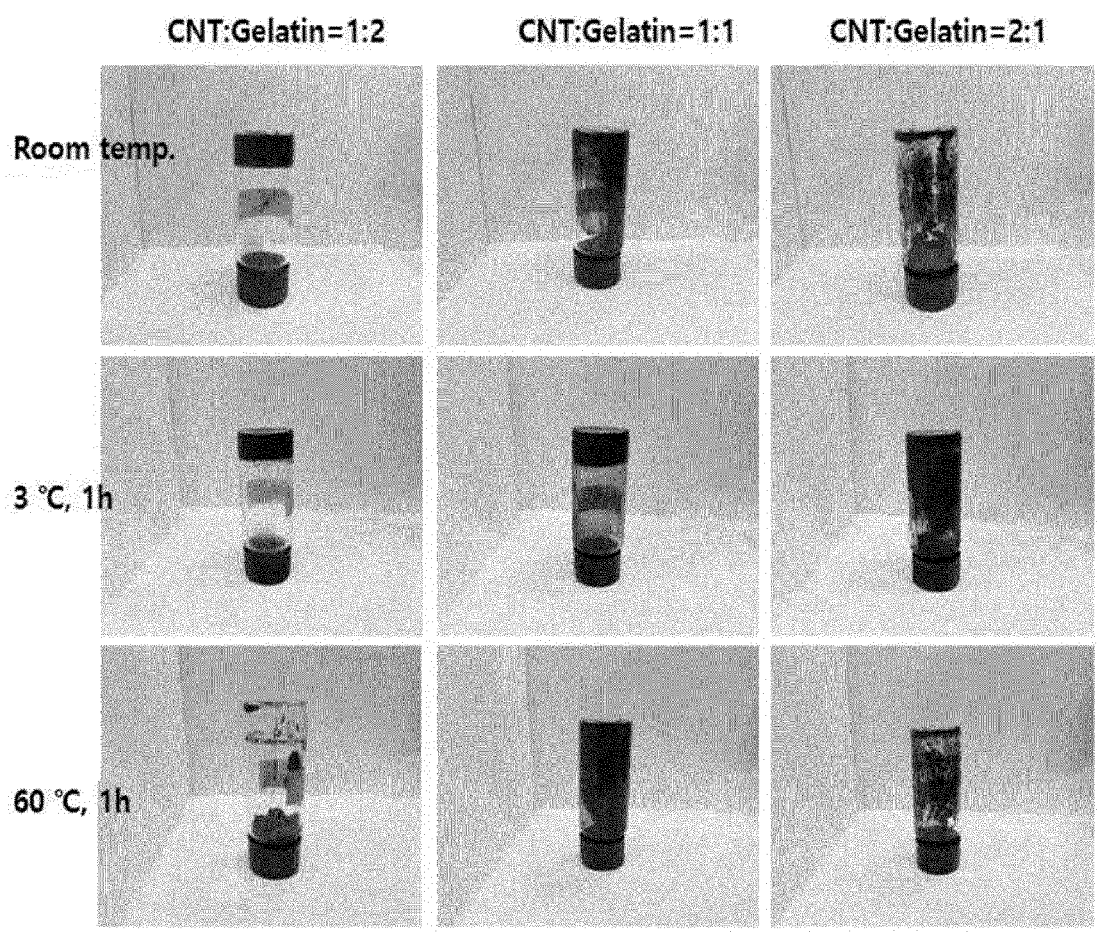
FIG. 1 illustrates carbon aerogel precursors prepared by embodiments of the present invention in the state of a jelly which does not flow even when they are turned upside down as the carbon aerogel precursors are gelated.

After leaving alone a carbon aerogel precursor obtained in an embodiment of the present invention at temperatures including room temperature, 3° C. and 60° C. for 1 hour, phase changes appearing according to the temperatures were analyzed, and results of analyzing the phase changes are illustrated in FIG. 1.

As shown in FIG. 1, it can be seen that a carbon aerogel precursor obtained by mixing gelatin with the CNT dispersion is gelated if the temperatures are relatively lowered while the carbon aerogel precursor is converted into a liquid phase if the temperatures are increased.

The carbon aerogel precursor is converted into a liquid phase by heat if the temperatures are increased in case of a low CNT mixing ratio while a gelation degree of the carbon aerogel precursor is shown to be high if the temperatures are lowered. On the other hand, it can be confirmed that the gelation degree of the carbon aerogel precursor is low although the temperatures are lowered in case of a high CNT mixing ratio.

Further, it can be seen in case of a sample 2 having a mixing ratio of CNT to gelatin of 1:1 that the carbon aerogel precursor is fully gelated if the temperatures are low, and the carbon aerogel precursor is converted into a liquid phase if the temperatures are increased.

Removal of a Dispersant

Figure 2:
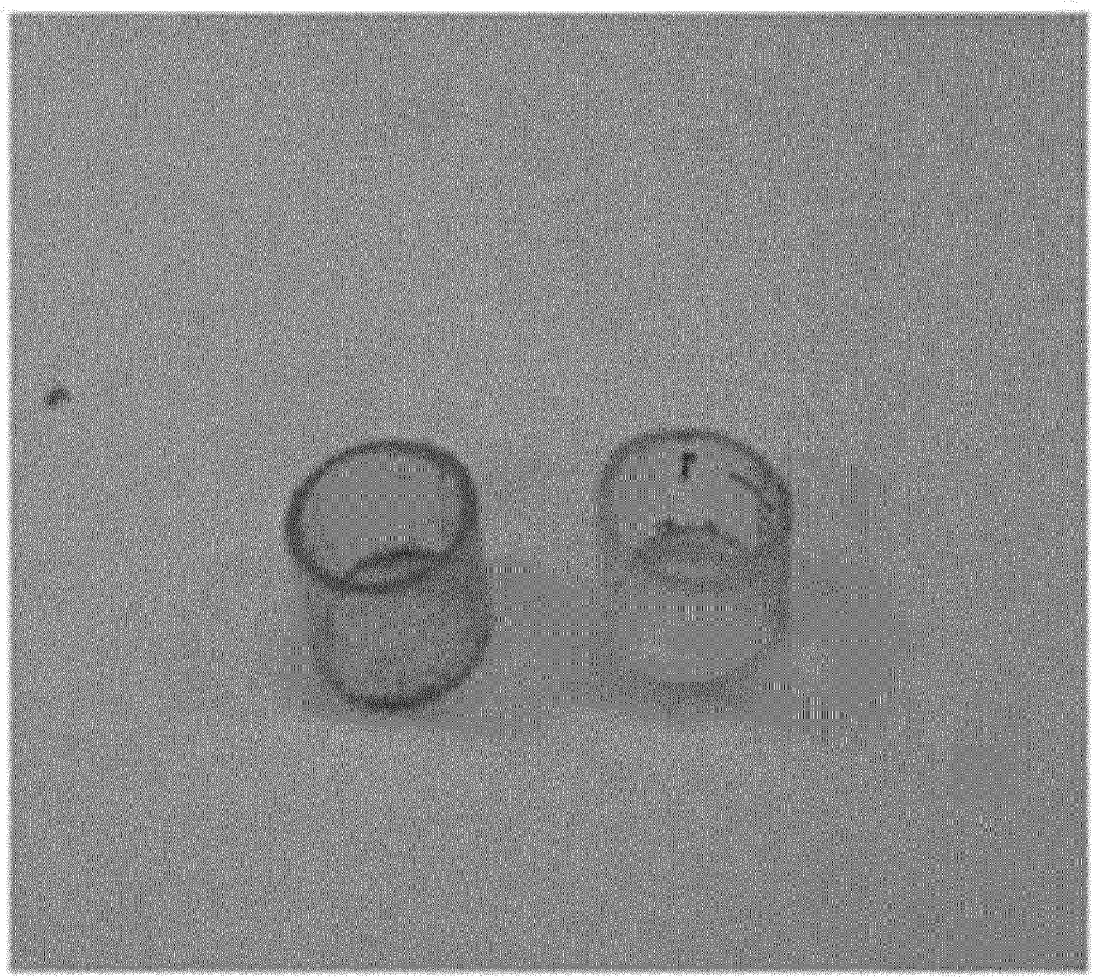
FIG. 2 illustrates a cylindrical mold manufactured to prepare carbon aerogels according to embodiments of the present invention.

After increasing temperatures of the foregoing obtained gelated CNT-gelatin mixed solutions to 200° C., thereby forming the gelated CNT-gelatin mixed solutions in a liquid phase, the gelated CNT-gelatin mixed solutions formed in the liquid phase were put into the cylindrical mold illustrated in FIG. 2 to form the gelated CNT-gelatin mixed solutions in a cylindrical shape.

After preparing ethanol solutions having concentrations of 10%, 20%, 40%, 80% and 100%, the gelated CNT-gelatin mixed solutions were sequentially dipped in the ethanol solutions while replacing the ethanol solutions from an ethanol solution having a lowest concentration to an ethanol solution having a highest concentration once every three hours. In this manner, carbon aerogel precursors were finally obtained by removing SDBS used as the dispersant in the foregoing preparation example in order to use the carbon material dispersion.

Figure 3:
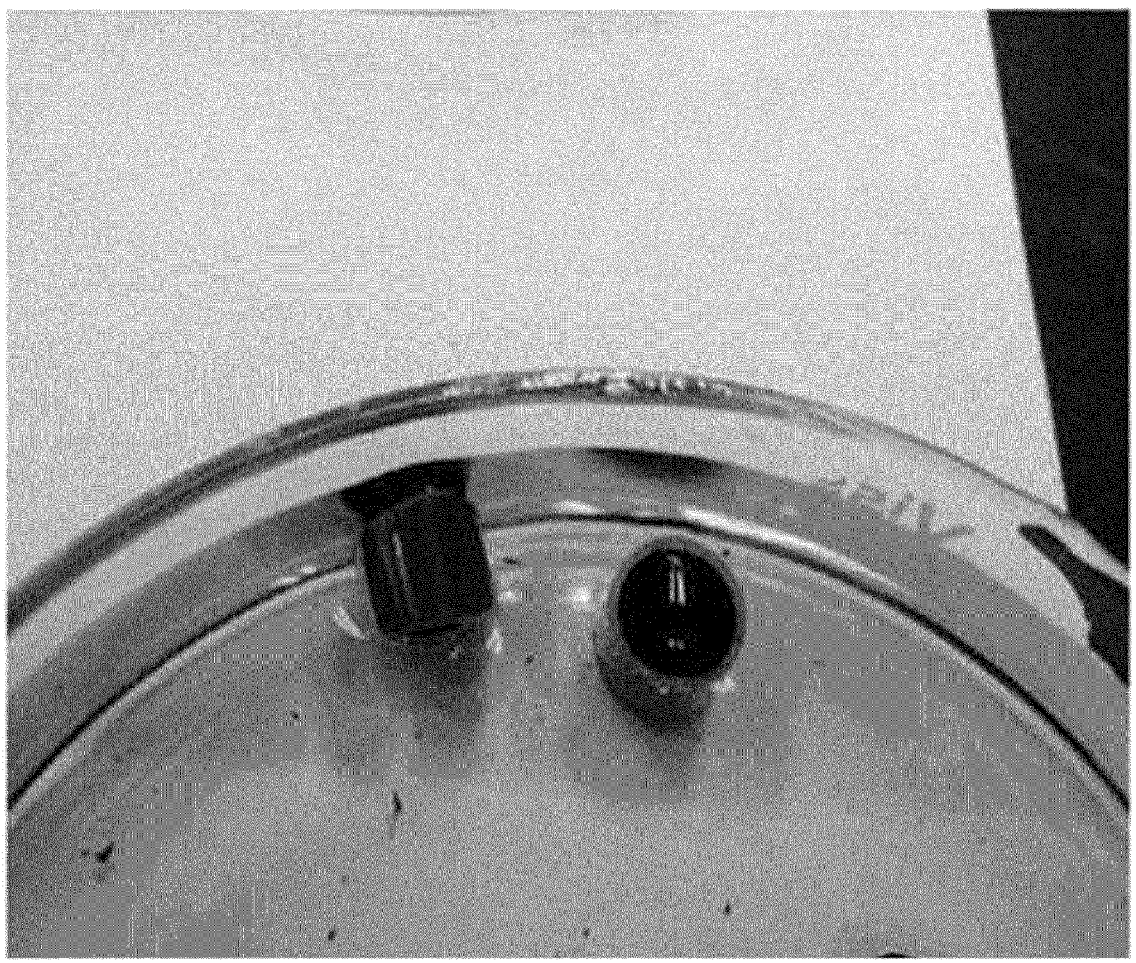
FIG. 3 illustrates a process of removing a dispersant by dipping carbon aerogel precursors according to embodiments of the present invention in ethanol.

A process of dipping the carbon aerogel precursors in ethanol to remove the dispersant is illustrated in FIG. 3.

Drying Process

Carbon aerogels were prepared by drying the carbon aerogel precursors while substituting ethanol impregnated in the previously dispersant-removed carbon aerogel precursors with carbon dioxide through a critical point dryer (CPD) process.

The CPD process in embodiments of the present invention was progressed in a method of drying the carbon aerogel precursors without damages to shape of the aerogels by blowing away carbon dioxide in the critical point state after substituting ethanol in the gelated carbon aerogel precursors with liquid carbon dioxide.

Figure 4:
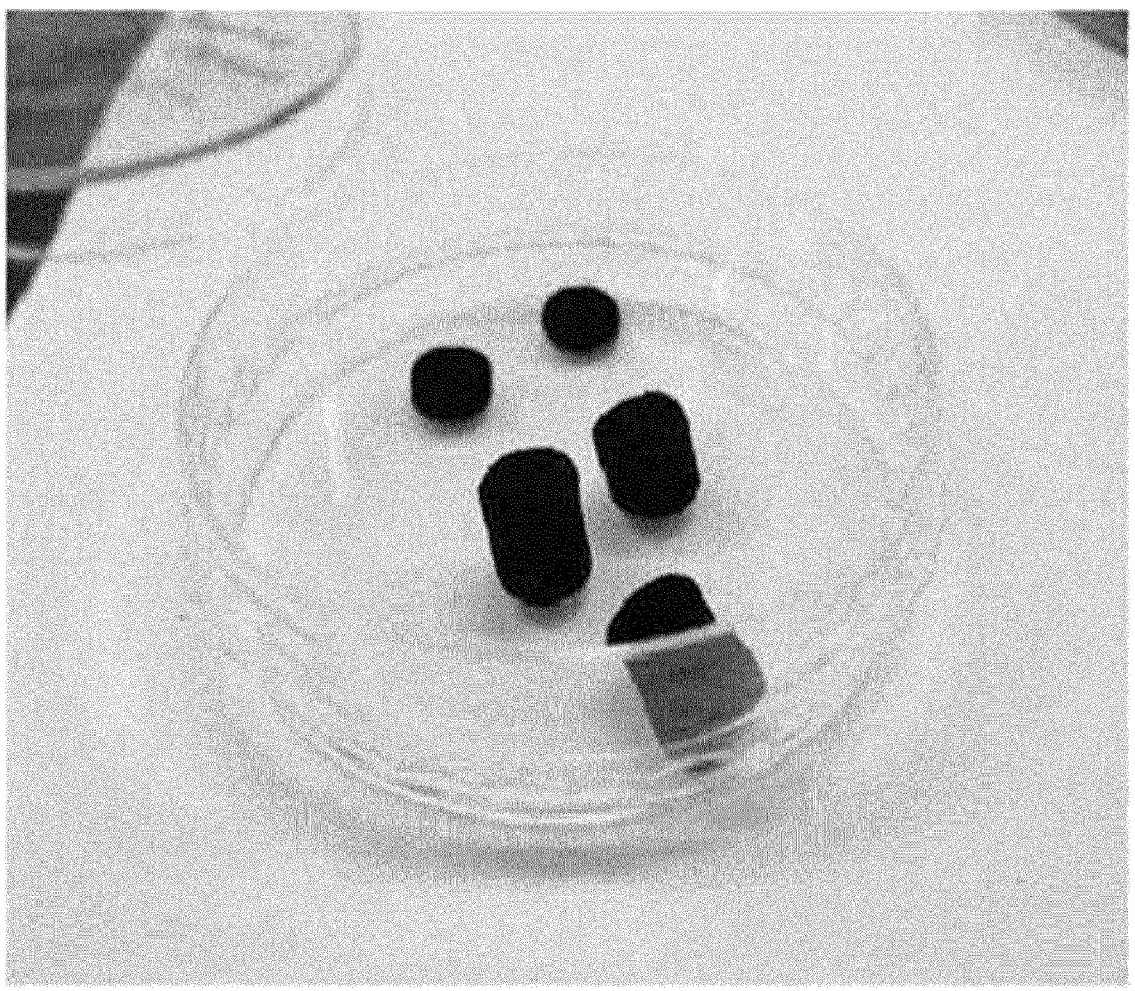
FIG. 4 and FIG. 5 illustrate carbon aerogel precursors dried by embodiments of the present invention and scanning electron microscope (SEM) photographs of the dried carbon aerogel precursors.

SEM photographs of carbon aerogels dried by the CPD process are illustrated in FIG. 4.

Carbonization Process

Carbon aerogels were prepared by heat-treating each of the previously dried carbon aerogel precursors at 600° C. and 1,050° C., thereby carbonizing the dried carbon aerogel precursors.

Figure 5:
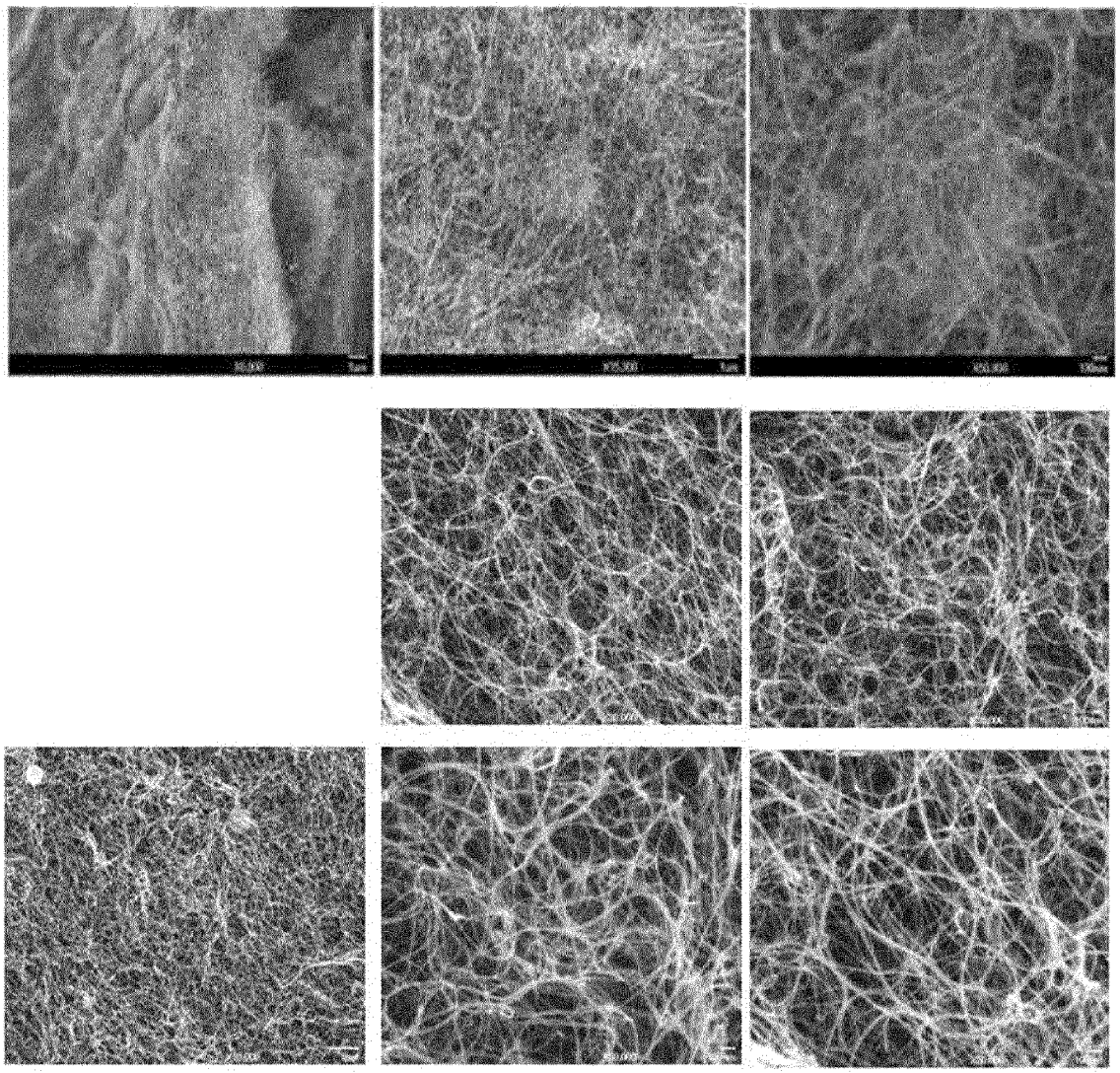
Figure 6:
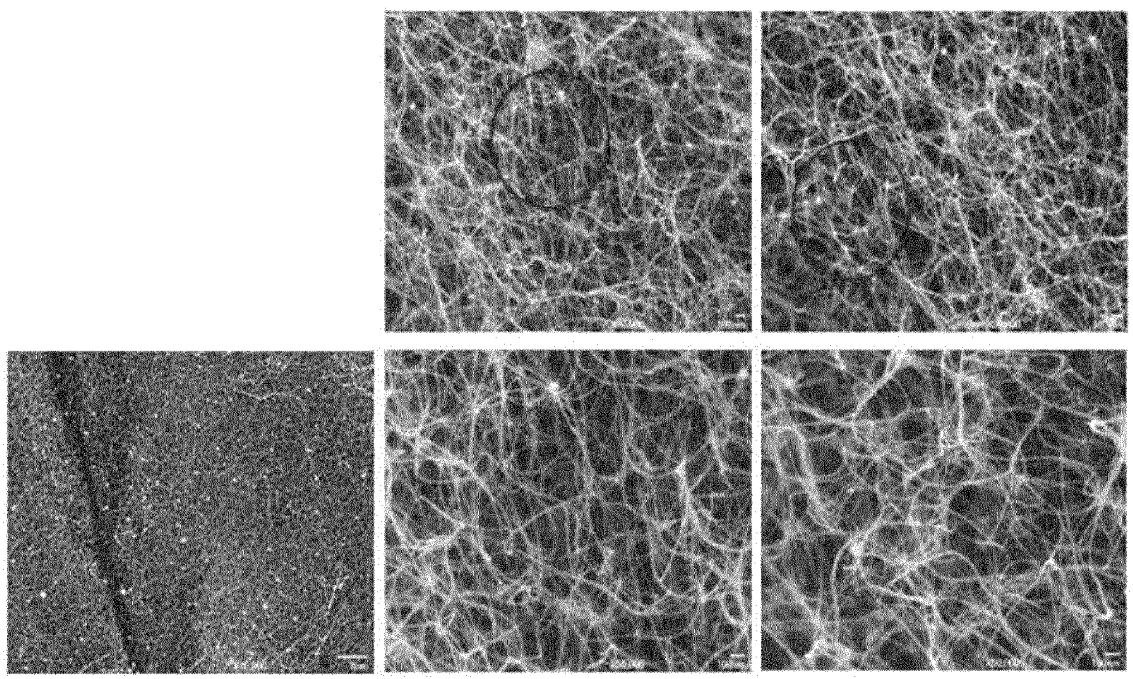
FIG. 6 illustrates results of measuring SEM photographs of carbon aerogels prepared by embodiments of the present invention.

After measuring SEM photographs of the carbon aerogels prepared by performing the heat treatment process, the measurement results are illustrated in FIG. 5 and FIG. 6.

As shown in FIG. 5 and FIG. 6, it can be seen that particles coated on the nanonetwork surface of the carbon aerogels after performing the heat treatment process differently from before performing the heat treatment process are observed.

<Experimental Example> Binding Energy Analysis

Figure 7:
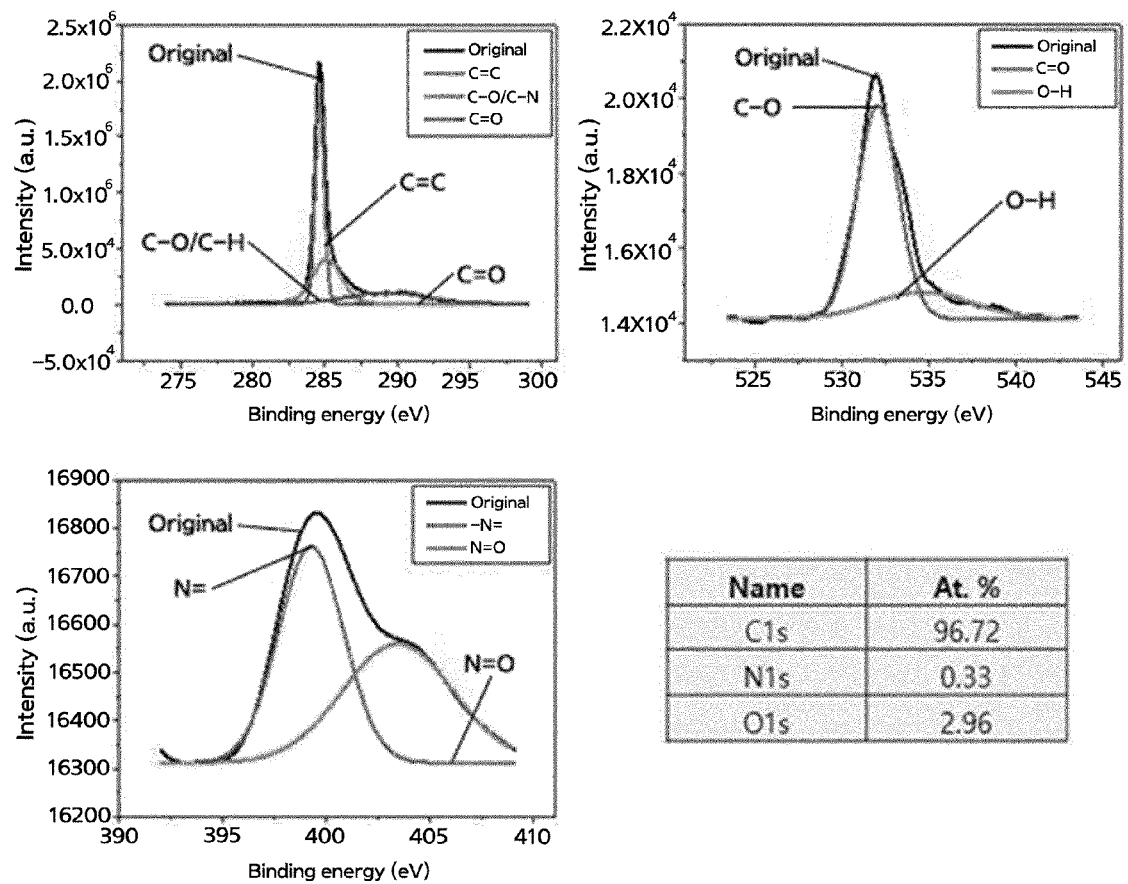
FIG. 7 illustrates results of measuring binding energies with respect to carbon aerogels prepared by embodiments of the present invention.

After measuring binding energies of carbonized carbon aerogels prepared in the carbonization process, measurement results are illustrated in FIG. 7.

It can be seen from FIG. 7 that peaks due to C—N and N═O bonds are additionally observed after the carbonization process rather than before the carbonization process, and carbon nanomaterials in which C—O bonds are decreased, and which are instead composed of C═C and C—N bonds are formed.

Therefore, it is determined that oxygen functional groups included in an existing gelatin are removed through the carbonization process, and the gelatin is converted into a carbon material which is composed of C═C and C—N bonds.

A carbon aerogel according to the present invention is doped with nitrogen, and a nitrogen doping ratio of the carbon aerogel is 0.001 to 0.1 of an atomic ratio of nitrogen to the carbon atom.

<Experimental Example> Specific Surface Area Analysis

Figure 8:
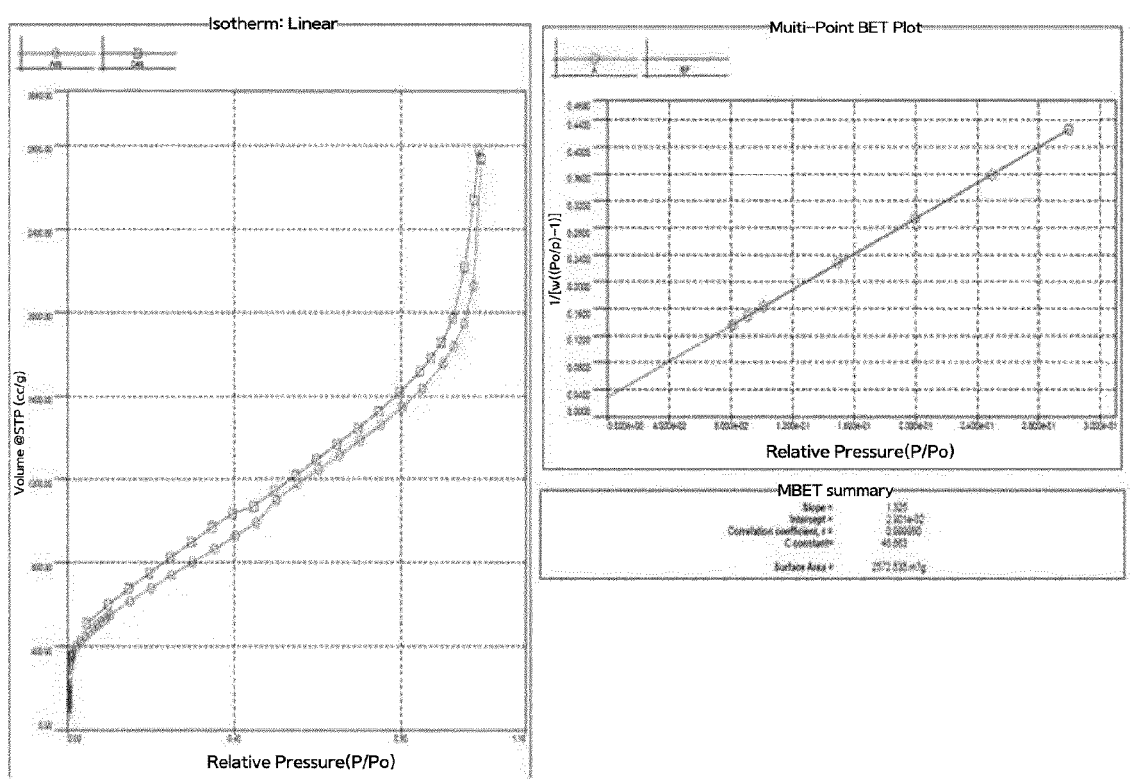
FIG. 8 illustrates results of measuring specific surface areas of the carbon aerogels prepared by embodiments of the present invention.

After measuring specific surface areas of carbonized carbon aerogels prepared in the carbonization process, the measurement results are illustrated in FIG. 8.

A conventionally known pristine nanotube aerogel exhibits a specific surface area of about 1,280 $m^2/g$, and a commercially available carbon aerogel exhibits a specific surface area of about 500 to 800 $m^2/g$.

As shown in FIG. 8, it can be seen that specific surface areas of the carbon aerogels have been greatly increased as much as not less than 2 to 3 times of surface area of a conventional carbon aerogel as the carbon aerogels prepared by embodiments of the present invention have a specific surface area of 2,572.5 $m^2/g$.

<Experimental Example> Pore Size Distribution Analysis

Figure 9:
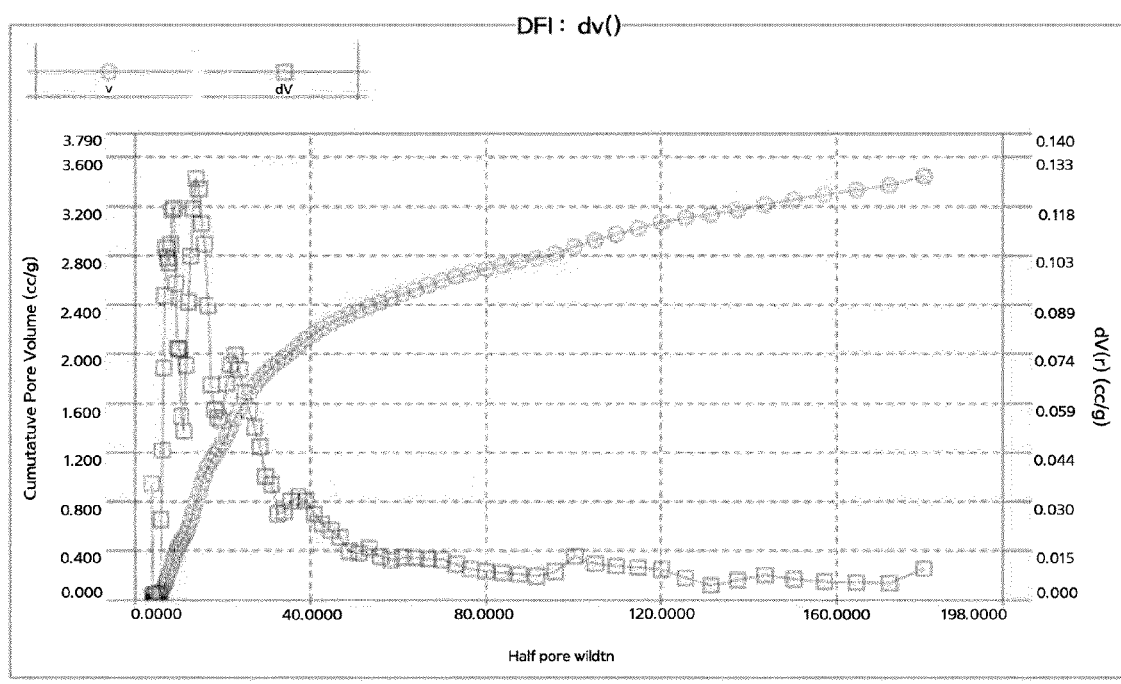
FIG. 9 illustrates results of measuring pore size distributions of the carbon aerogels prepared by embodiments of the present invention.

After measuring pore size distributions of carbonized carbon aerogels prepared in the carbonization process, the measurement results are illustrated in FIG. 9.

FIG. 9 is a graph illustrating the measurement results after measuring pore channel size distributions by a mercury porosity device. In the present experiment, Autosorb IQ equipment manufactured by Quantachrome Corporation was used as surface area and pore analyzing equipment, and the analysis process was performed using nitrogen gas. Surface areas were calculated through the Brunauer-Emmett-Teller (BET) method, and pore size distributions were derived through the NL-DFT method.

In FIG. 9, an X-axis indicates radius of pores. Referring to FIG. 9, it can be confirmed that sizes of pore channels in all samples of the carbonized carbon aerogels prepared in the carbonization process show bimodal distributions composed of peaks indicated by micropores of 2 nm or less and peaks indicated by mesopores of 2 nm or more.

More specifically, a maximum peak of micropores is present in a range of 0.2 to 2 nm, and a maximum peak of macropores is present in a range of 2 to 40 nm.

[Preparation 2 of Carbon Aerogel Precursors and Carbon Aerogels]

<Preparation Example> Preparation of Carbon Material Dispersions

After adding sodium dodecylbenzene sulfonate (SDBS) as a dispersant to distilled water as a dispersion medium to obtain a mixed solution, the carbon nanotube was uniformly dispersed in the mixed solution by mixing a carbon nanotube with the mixed solution at a ratio of 0.5 wt %.

After applying ultrasonic waves to a mixed solution of the carbon nanotube and a solvent and dispersing the carbon nanotube in the solvent for 2 hours to obtain a carbon material dispersion, a centrifugation process of the carbon material dispersion was performed to separate a supernatant from the carbon material dispersion. A carbon nanotube dispersion was prepared by evaporating the solvent from the separated supernatant, thereby adjusting concentration of the carbon material dispersion to 1.0 wt %.

Preparation of Carbon Aerogel Precursors

After mixing 3 mg of gelatin with 1 ml of distilled water, a gelatin solution was prepared by stirring the gelatin in the water until the gelatin was fully dissolved in the water at about 50° C.

Subsequently, gelated carbon aerogel precursors were prepared by mixing 200 parts by weight of the gelatin solution as the binder and 100 parts by weight of sucrose having a concentration of 0.5 M as the carbon precursor per 100 parts by weight of the total weight of the carbon material dispersion prepared in the foregoing preparation example to obtain a mixed solution, uniformly dispersing the gelatin solution and sucrose in the carbon material dispersion while applying ultrasonic waves to the mixed solution at a temperature of 50° C., and leaving alone the gelatin solution and sucrose dispersed in the carbon material dispersion at a temperature of 10° C. for 1 hour.

Removal of a Dispersant

After increasing temperatures of the foregoing prepared carbon aerogel precursors to 60° C., thereby forming the carbon aerogel precursors in a liquid phase, the carbon aerogel precursors formed in the liquid phase were put into the cylindrical mold to form the carbon aerogel precursors in a cylindrical shape.

After preparing ethanol solutions having concentrations of 10%, 20%, 40%, 80% and 100%, SDBS used as the dispersant in order to use the carbon material dispersion was removed by sequentially dipping the prepared gelated CNT-gelatin-sucrose mixed solutions in the ethanol solutions while replacing the ethanol solutions in order from an ethanol solution having a lowest concentration to an ethanol solution having a highest concentration once every three hours.

Drying Process

Carbon aerogels were prepared by drying the carbon aerogel precursors while substituting ethanol in the dispersant-removed carbon aerogel precursors with carbon dioxide through a critical point dryer (CPD) process.

The CPD process was progressed in a method of drying the carbon aerogel precursors without damages to shape of the aerogels by blowing away carbon dioxide in the critical point state after substituting ethanol in the gelated carbon aerogel precursors with liquid carbon dioxide.

Figure 10:
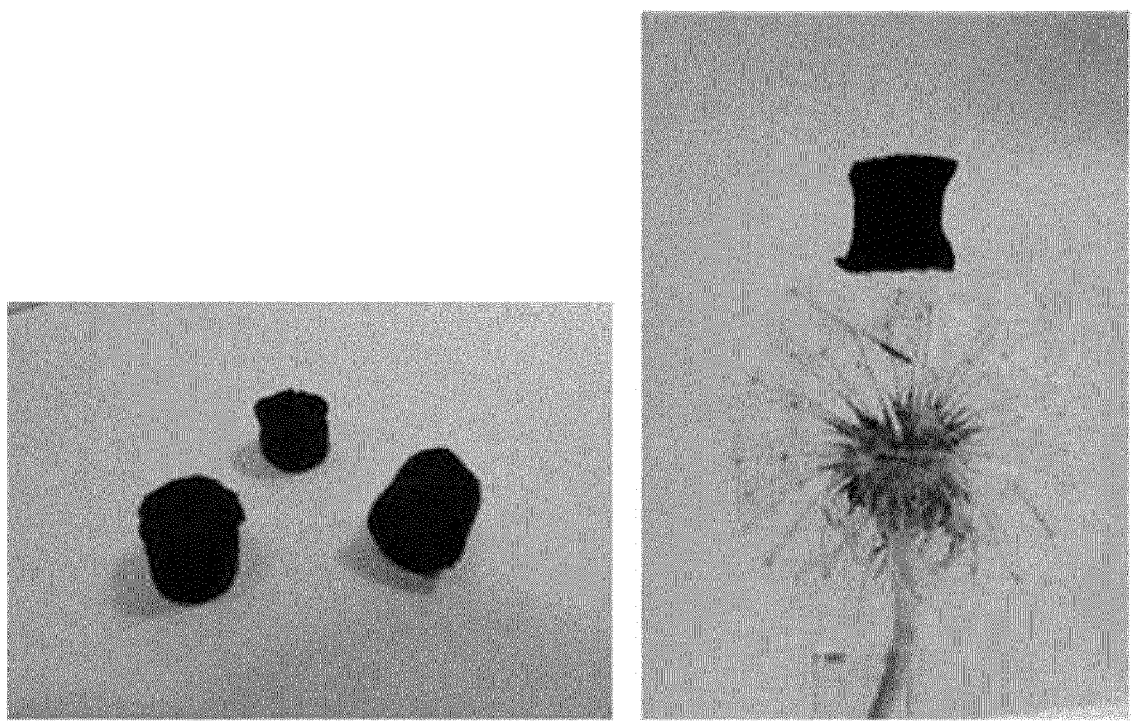
FIG. 10 and FIG. 11 are a carbon aerogel precursor dried by an embodiment of the present invention and SEM photographs of the carbon aerogel precursor.
Figure 11:
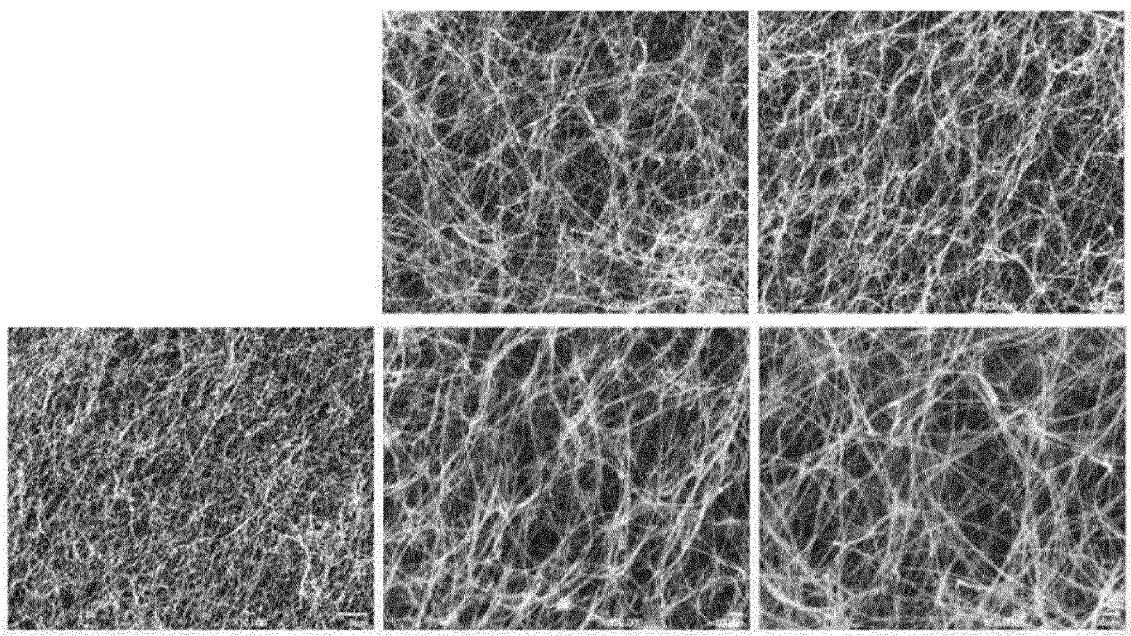

The dried carbon aerogel precursors and SEM photographs of the carbon aerogel precursors are illustrated in FIG. 10 and FIG. 11.

Carbonization Process

Carbon aerogels according to embodiments of the present invention were prepared by heat-treating each of the dried carbon aerogel precursors at 600° C. and 1,050° C., thereby carbonizing the dried carbon aerogel precursors.

<Experimental Example> SEM Measurement

Figure 12:
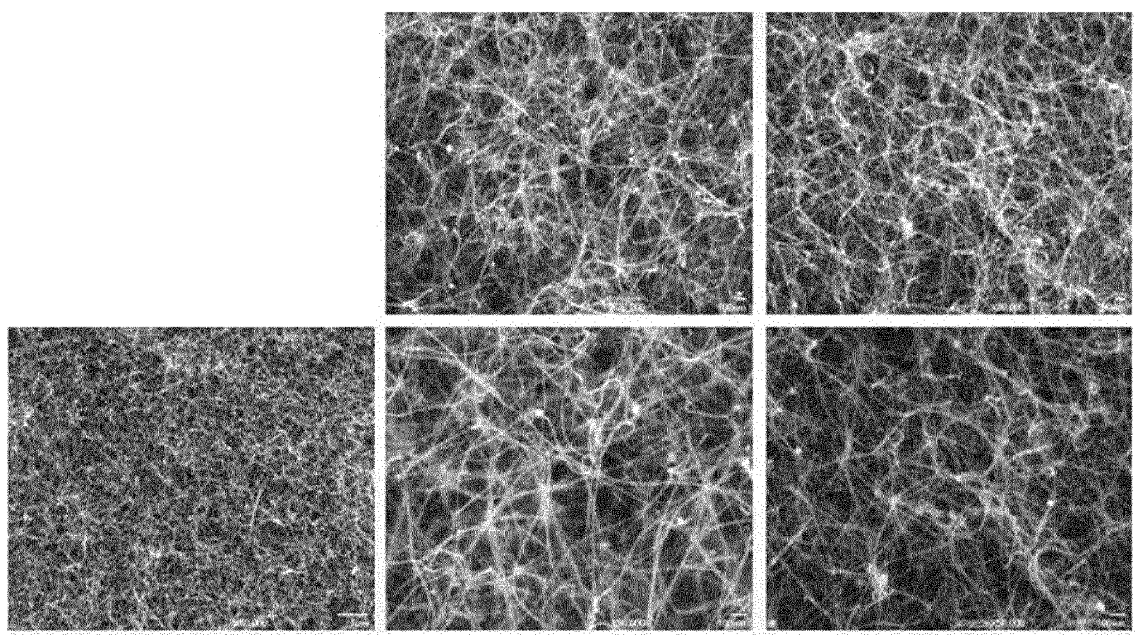
FIG. 12 is SEM photographs of a carbon aerogel heat-treated by an embodiment of the present invention.

SEM photographs of the carbon aerogels heat-treated at 1,050° C. by embodiments of the present invention are illustrated in FIG. 12.

It can be seen from FIG. 12 that portions coated with carbon particles are observed between nanofibers which form a network in the carbon aerogels according to embodiments of the present invention.

<Experimental Example> TEM Measurement

Figure 13:
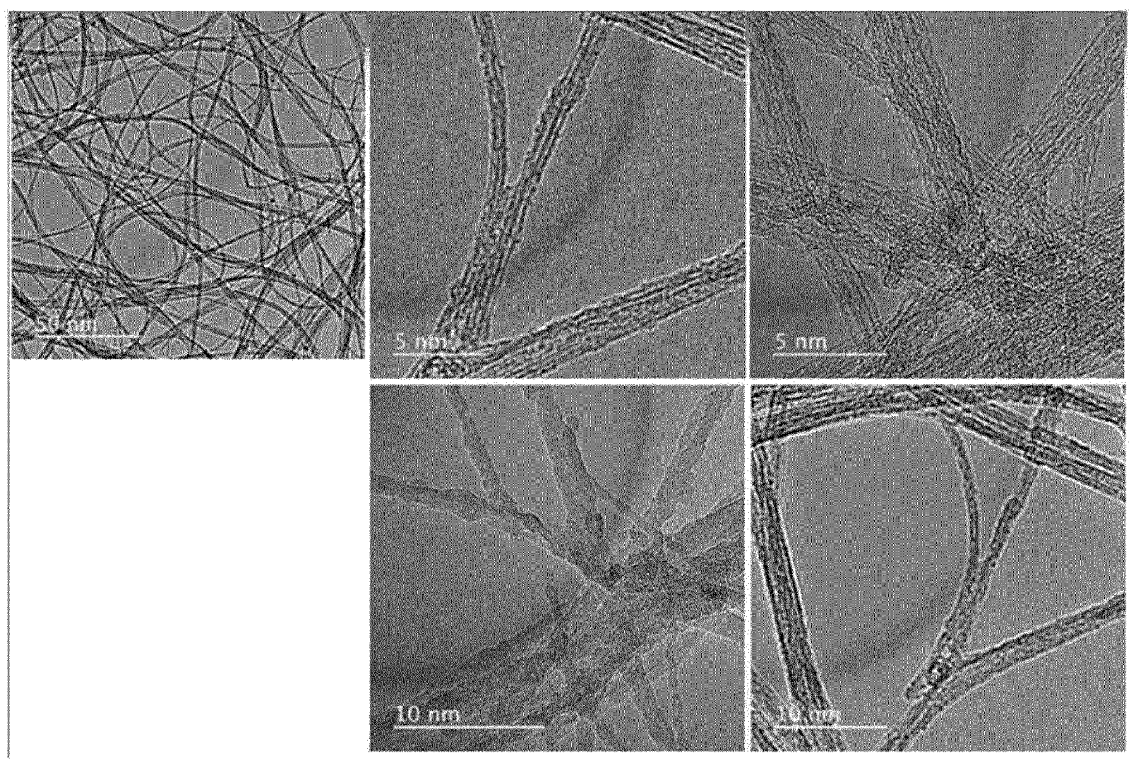
FIG. 13 and FIG. 14 are transmission electron microscope (TEM) photographs of a carbon aerogel prepared by an embodiment of the present invention.
Figure 14:
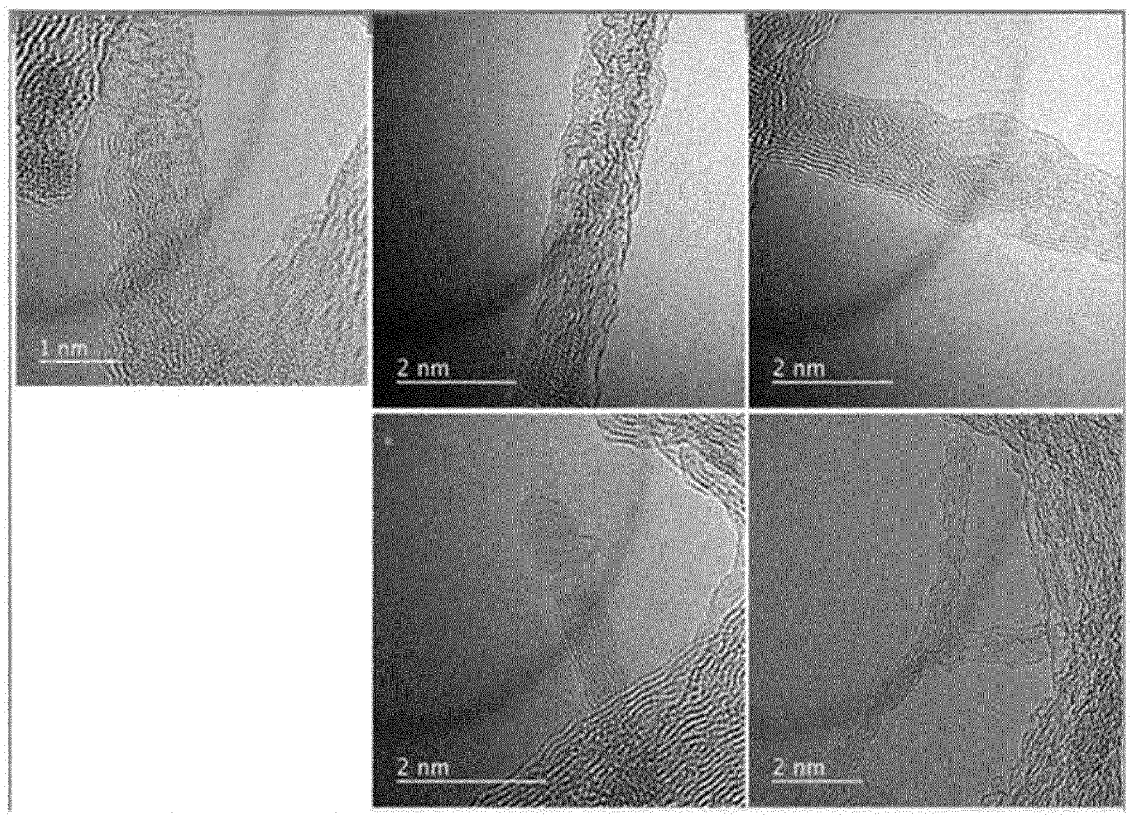

TEM photographs of carbon aerogels prepared by the embodiments of the present invention are illustrated in FIG. 13 and FIG. 14.

As shown in FIG. 13 and FIG. 14, it can bee confirmed that carbon particles are formed on the surface of nanofibers in a carbon aerogel according to the present invention, and it can be confirmed that the carbon particles are arranged while constantly exhibiting orientation and forming a load in the nanofibers which form the carbon aerogels.

<Experimental Example> Binding Energy Analysis

Figure 15:
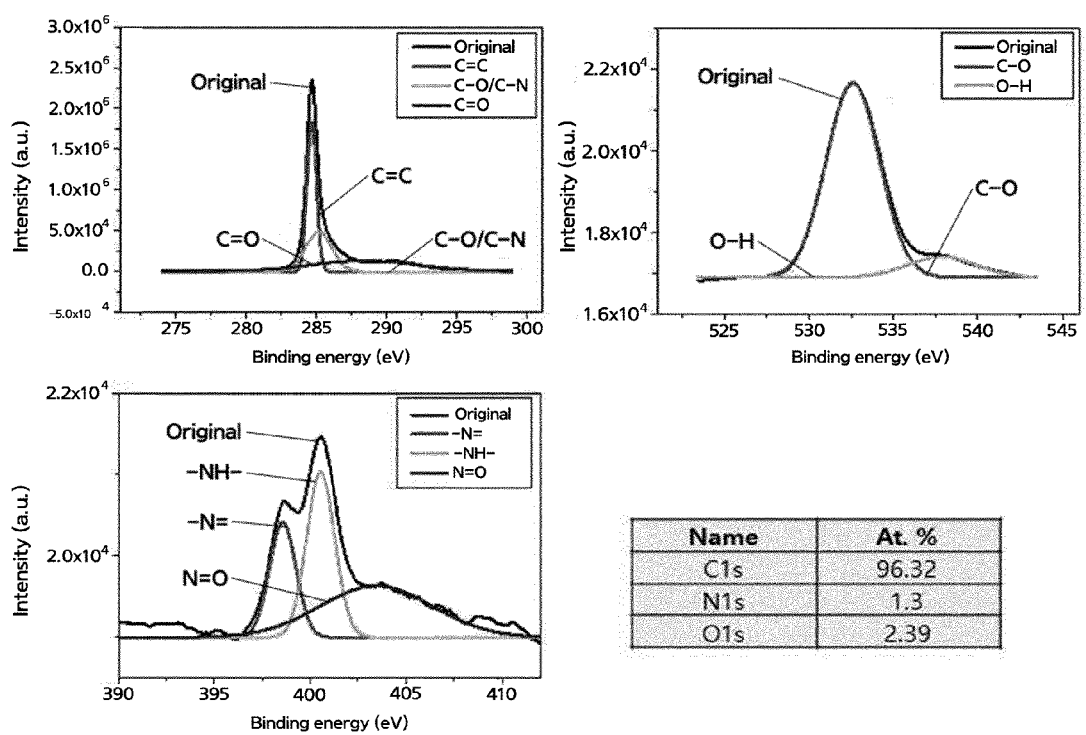
FIG. 15 is results of measuring binding energies of a carbon aerogel prepared by an embodiment of the present invention.

After measuring binding energies of the carbon aerogel prepared in an embodiment of the present invention, measurement results are illustrated in FIG. 15.

As shown in FIG. 15, it can be seen that peaks due to C—N and N=O bonds are additionally observed after the carbonization process rather than before the carbonization process, and carbon nanomaterials in which C—O bonds are decreased, and which are instead composed of C=C and C—N bonds are formed.

From this, it is determined that oxygen functional groups included in an existing gelatin are converted into a carbon material which is composed of C=C and C—N bonds through the carbonization process in an aerogel according to the present invention.

As an aerogel according to the present invention was measured to contain 1.3 at. % of N when containing 96.32 at. % of C, a doping ratio of nitrogen to carbon in the carbon aerogel was measured to be 0.0135.

<Experimental Example> Specific Surface Area Analysis

Figure 16:
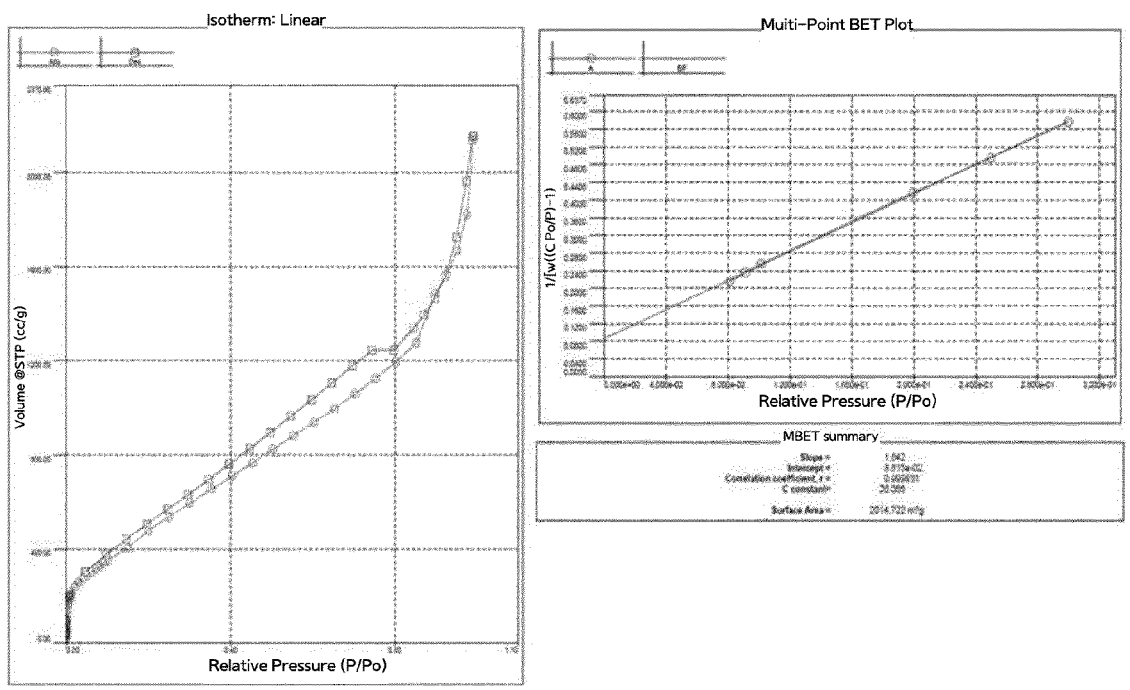
FIG. 16 is results of measuring specific surface areas of the carbon aerogels prepared by embodiments of the present invention.

Results of measuring specific surface areas of the carbonized carbon aerogels are illustrated in FIG. 16.

A conventionally known pristine nanotube aerogel exhibits a specific surface area of about 1,280 $m^2/g$, and a commercially available carbon aerogel exhibits a specific surface area of about 500 to 800 $m^2/g$.

As shown in FIG. 16, it can be seen that specific surface areas of the carbon aerogels have been greatly increased as much as not less than 2 to 3 times of surface area of a conventional carbon aerogel as the carbon aerogels prepared by embodiments of the present invention have a specific surface area of 2,014 m$^2$/g.

<Experimental Example> Pore Size Distribution Analysis

Figure 17:
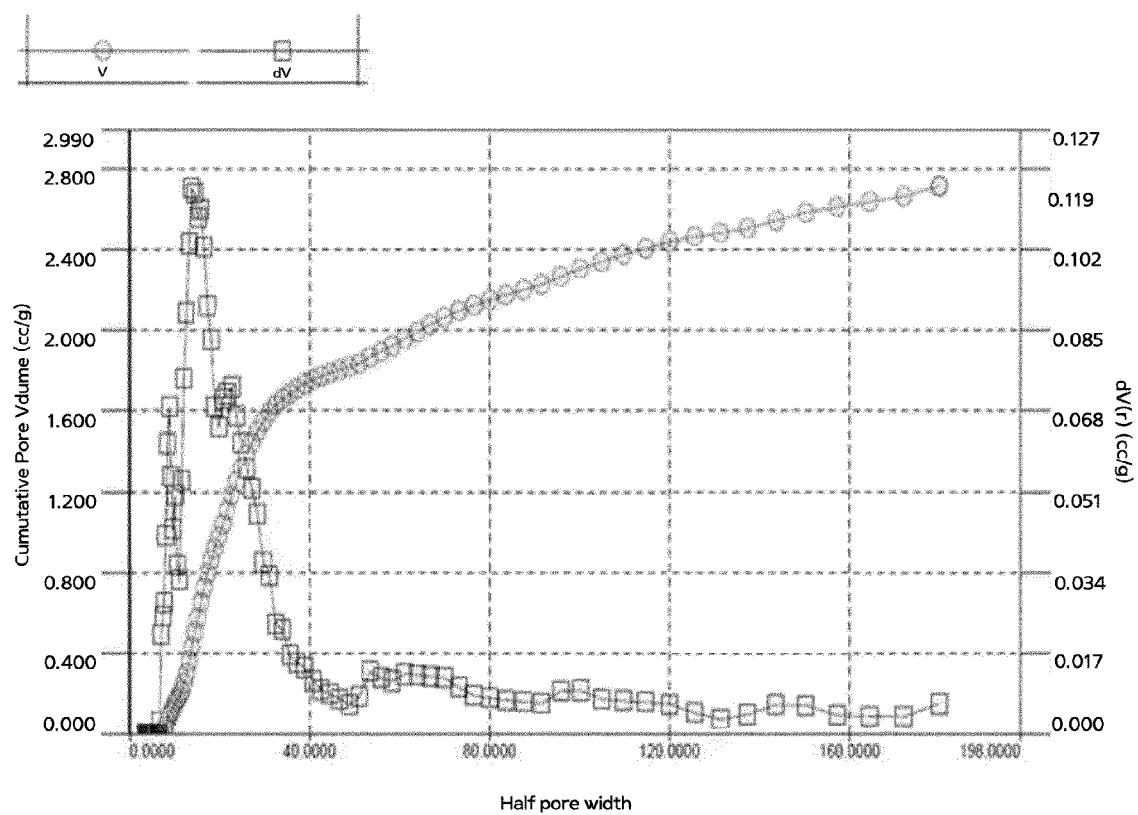
FIG. 17 is results of measuring pore size distributions of the carbon aerogels prepared by embodiments of the present invention.

After measuring pore size distributions of the prepared carbon aerogels, the measurement results are illustrated in FIG. 17. FIG. 17 is a graph illustrating the measurement results after measuring pore channel size distributions by a mercury porosity device.

In the present experiment, Autosorb IQ equipment manufactured by Quantachrome Corporation was used as surface area and pore analyzing equipment, and the analysis process was performed using nitrogen gas. Surface areas were calculated through the Brunauer-Emmett-Teller (BET) method, and pore size distributions were derived through the NL-DFT method.

In FIG. 17, an X-axis indicates radius of pores. Referring to FIG. 17, it can be confirmed that sizes of pore channels in all samples show bimodal distributions composed of peaks indicated by micropores of 2 nm or less and peaks indicated by mesopores of 2 nm or more, and most of pores are composed of the mesopores of 2 nm or more.

[Production of Carbon Aerogel Graphene Composites]
Preparation of Carbon Aerogel Precursors
(1) Preparation of a Carbon Material Dispersion After adding sodium dodecylbenzene sulfonate (SDBS) as a dispersant to distilled water as a dispersion medium to obtain a mixed solution, the carbon nanotube was uniformly dispersed in the mixed solution by mixing a carbon nanotube with the mixed solution at a ratio of 0.1 wt %. After applying ultrasonic waves to a mixed solution of the carbon nanotube and a solvent and dispersing the carbon nanotube in the solvent for 2 hours to obtain a carbon nanotube dispersion, a centrifugation process of the carbon nanotube dispersion was performed to separate a supernatant from the carbon nanotube dispersion, and a carbon material dispersion was prepared by evaporating the solvent from the separated supernatant, thereby adjusting concentration of the dispersion to 0.8 wt %.

(2) Preparation of a Gelatin Solution

After mixing 3 g of gelatin with 1 ml of distilled water, a gelatin solution was prepared by stirring the gelatin in the water until the gelatin was fully dissolved in the water at about 50° C.

(3) Mixing of a Carbon Material Dispersion and a Gelatin Solution

After mixing 200 parts by weight of the gelatin solution as the binder and 100 parts by weight of sucrose having a concentration of 0.5 M as the carbon precursor with respect to 100 parts by weight of the total weight of the carbon material dispersion to obtain a mixed solution, gelated carbon aerogel precursors were prepared by uniformly dispersing the gelatin solution and sucrose in the carbon material dispersion while applying ultrasonic waves to the mixed solution at a temperature of 50° C., and leaving alone the gelatin solution and sucrose dispersed in the carbon material dispersion at a temperature of 10° C. for 1 hour.

Preparation of Carbon Aerogel Graphene Composite Mixed Solutions

After mixing a graphene oxide with the prepared carbon aerogel precursors at a weight ratio of 5:5 to obtain mixed solutions and applying ultrasonic waves to the mixed solutions, thereby dispersing the graphene oxide in the carbon aerogel precursors for 1 minute, carbon aerogel graphene composite mixed solutions were prepared by evaporating distilled water from the mixed solution.

Manufacturing of Carbon Aerogel Graphene Composite Nanofibers

Carbon aerogel graphene composite nanofibers were extracted from the prepared carbon aerogel graphene composite mixed solutions by wet spinning, and the extracted carbon aerogel graphene composite nanofibers were dried at room temperature.

<Experimental Example> Optical Microscope Analysis

Figure 18:
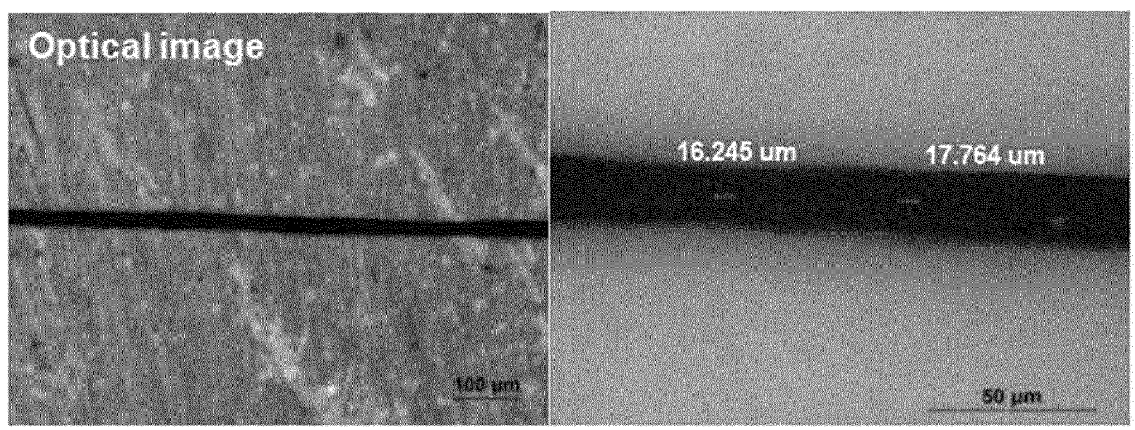
FIG. 18 is optical microscope photographs of a carbon aerogel graphene composite produced by an embodiment of the present invention.

After measuring SEM photographs of the carbon aerogel graphene composite nanofibers manufactured in embodiments of the present invention, the measurement results are illustrated in FIG. 18.

As shown in FIG. 18, it can be seen that the carbon aerogel graphene composite nanofibers manufactured by the present invention have a thickness of 16 to 18 μm.

<Experimental Example> Tensile Strength Measurement

Figure 19:
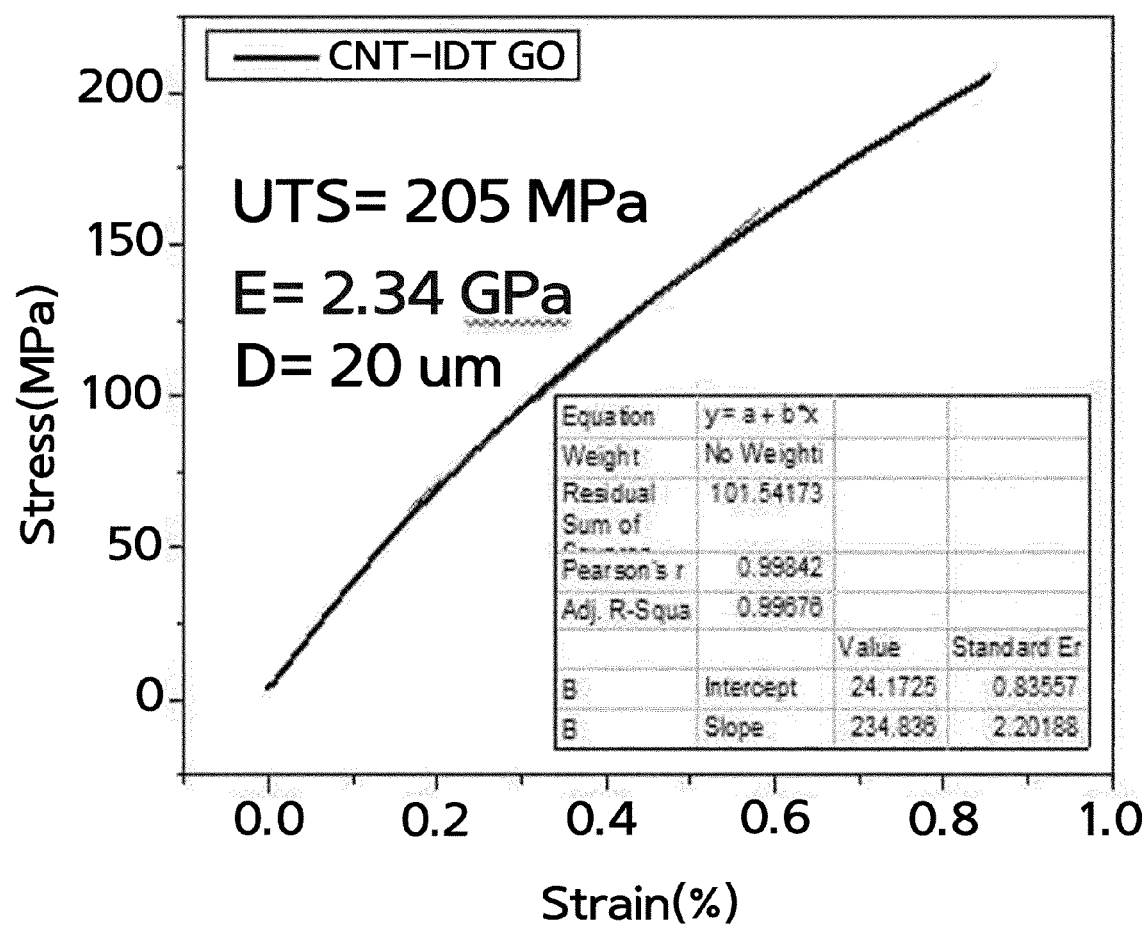
FIG. 19 is a tensile strength measurement result of the carbon aerogel graphene composite produced by an embodiment of the present invention.

After measuring tensile strength values of the carbon aerogel graphene composite nanofibers manufactured in embodiments of the present invention, the measurement results are illustrated in FIG. 19.

As shown in FIG. 19, it can be seen that carbon aerogel graphene composite nanofibers having a diameter of 20 μm manufactured by the present invention are excellent in mechanical strength by having a tensile strength value of 2.34 GPa.

<Experimental Example> Scanning Electron Microscopy (SEM) Analysis

Figure 20:
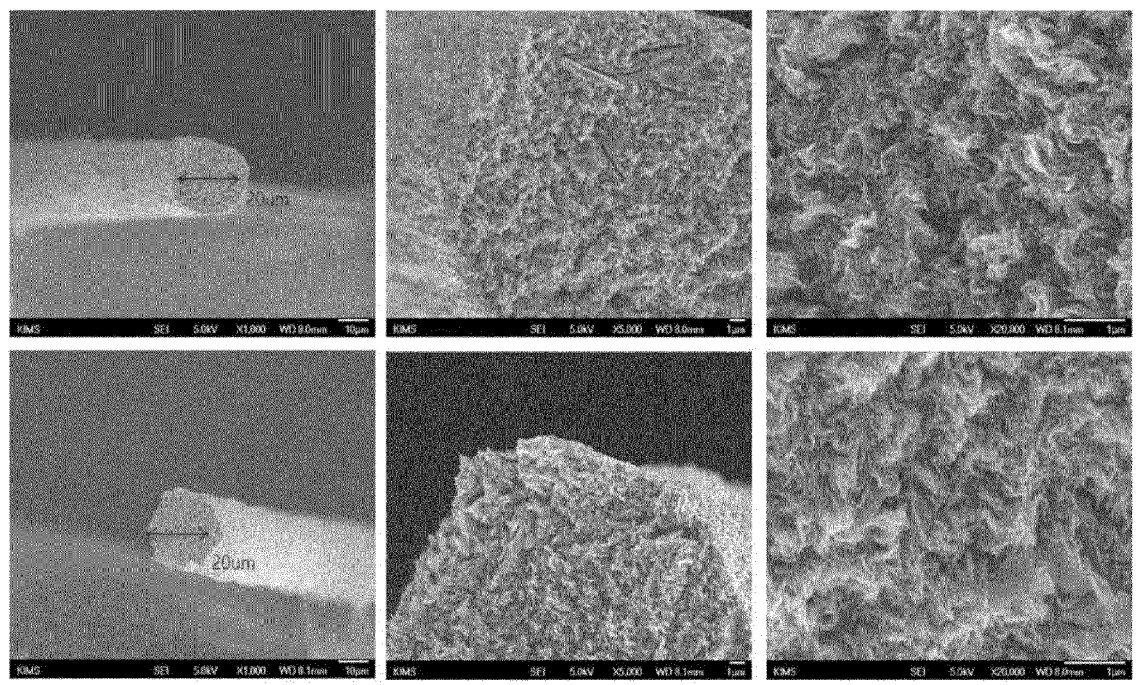
FIG. 20 and FIG. 21 are SEM photographs showing inner section and surface of a carbon aerogel graphene composite before reduction produced by an embodiment of the present invention.
Figure 21:
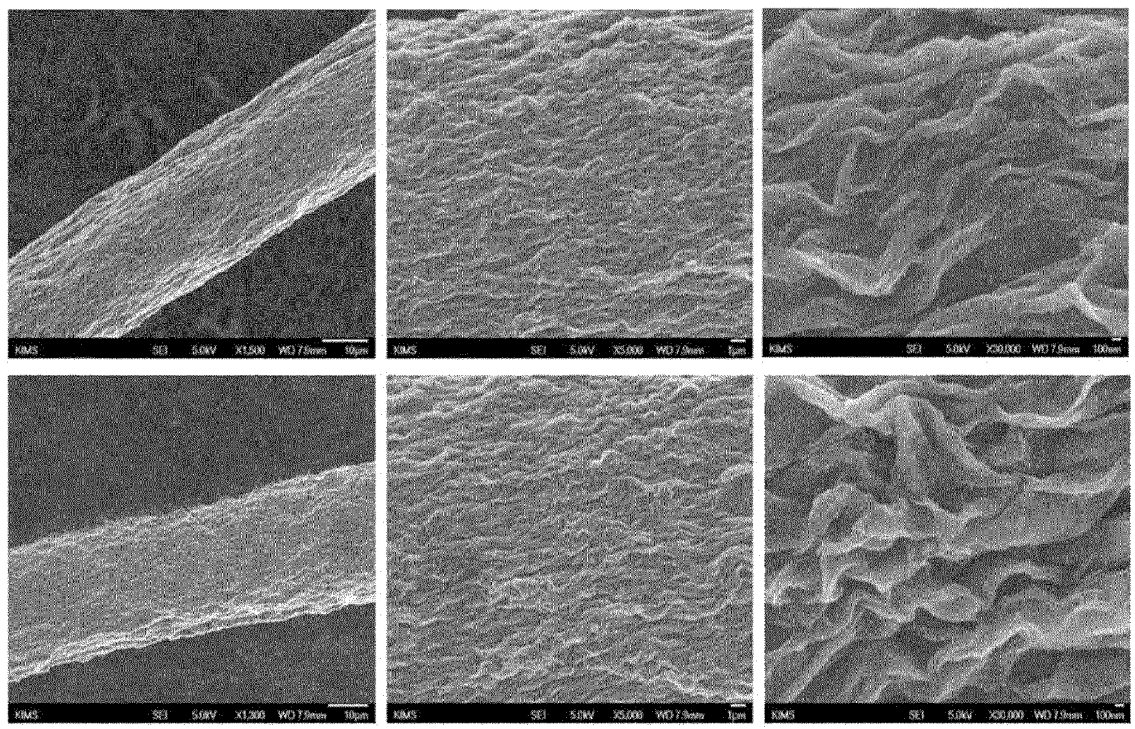

After performing SEM analysis of inner sections and surfaces of the carbon aerogel graphene composite nanofibers before carbonization produced by embodiments of the present invention, the analysis results are illustrated in FIG. 20 and FIG. 21.

<Experimental Example> Heat Treatment of Carbon Aerogel Graphene Composite Nanofibers The carbon aerogel graphene composite nanofibers manufactured in embodiments of the present invention were heat-treated at a temperature of 1,000° C. for 2 hours to reduce graphene oxide and carbonize the carbon aerogel graphene composite nanofibers by gelatin.

<Experimental Example> Transmission Electron Microscopy Analysis

Figure 22:
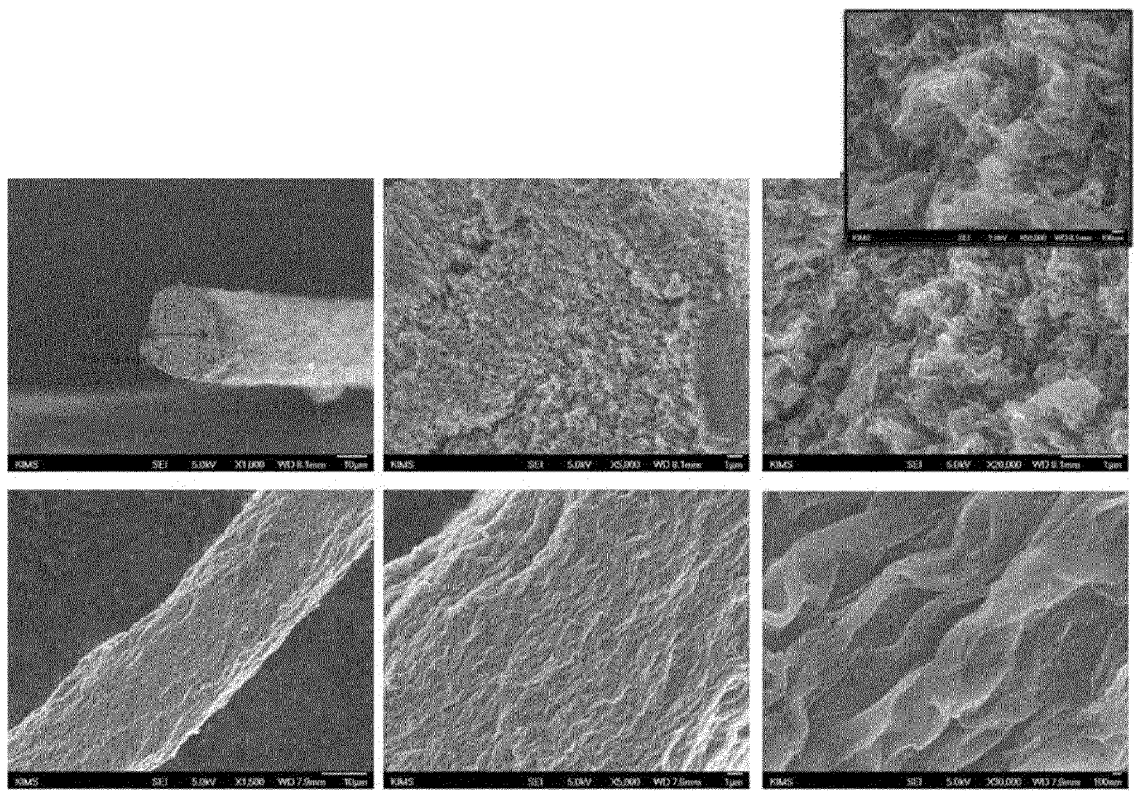
FIG. 22 is SEM photographs of the carbon aerogel graphene composite produced by an embodiment of the present invention.

After performing SEM analysis of the heat-treated carbon aerogel graphene composite nanofibers, analysis results are illustrated in FIG. 22.

As shown in FIG. 22, it can be confirmed that a carbon aerogel graphene composite nanofiber manufactured by the present invention has surface wrinkles formed in the longitudinal direction thereof, and the surface wrinkles are communicated with the inside of the carbon aerogel graphene composite nanofiber such that wrinkles are formed in the carbon aerogel graphene composite nanofiber.

Further, it can be seen that SEM image shapes for the graphene become more clear since graphene oxide and gelatin that are nonconductive materials are reduced and carbonized after the heat treatment process such that the carbon aerogel graphene composite nanofiber exhibits conductivity.

<Manufacturing Example> Manufacturing of a Three-Electrode System

A three-electrode system was prepared by using a silver/silver chloride electrode as a reference electrode, using a platinum electrode as a counter electrode, and using the carbon aerogel carbon nanotube composite or the heat-treated carbon aerogel graphene composite nanofiber as a working electrode. 0.2 M $Na_2SO_4$ was used as an electrolyte solution.

<Experimental Example> Charge-Discharge and Cyclic Voltammetry Test

Figure 23:
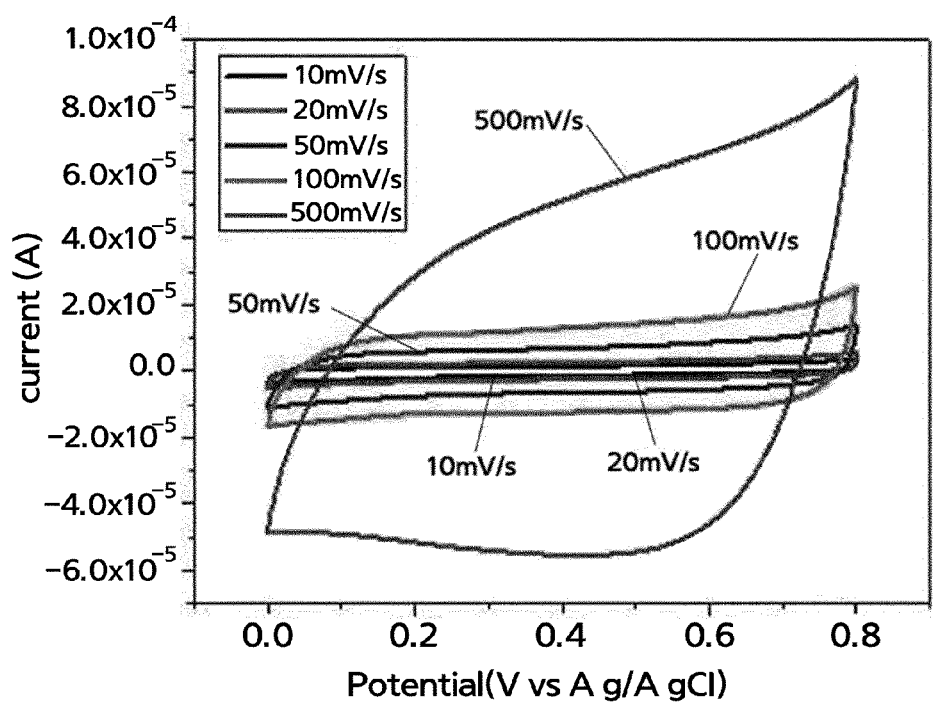
FIG. 23 and FIG. 24 are cyclic voltammetry measurement results in a three-electrode system including the carbon aerogel graphene composite produced by an embodiment of the present invention.
Figure 24:
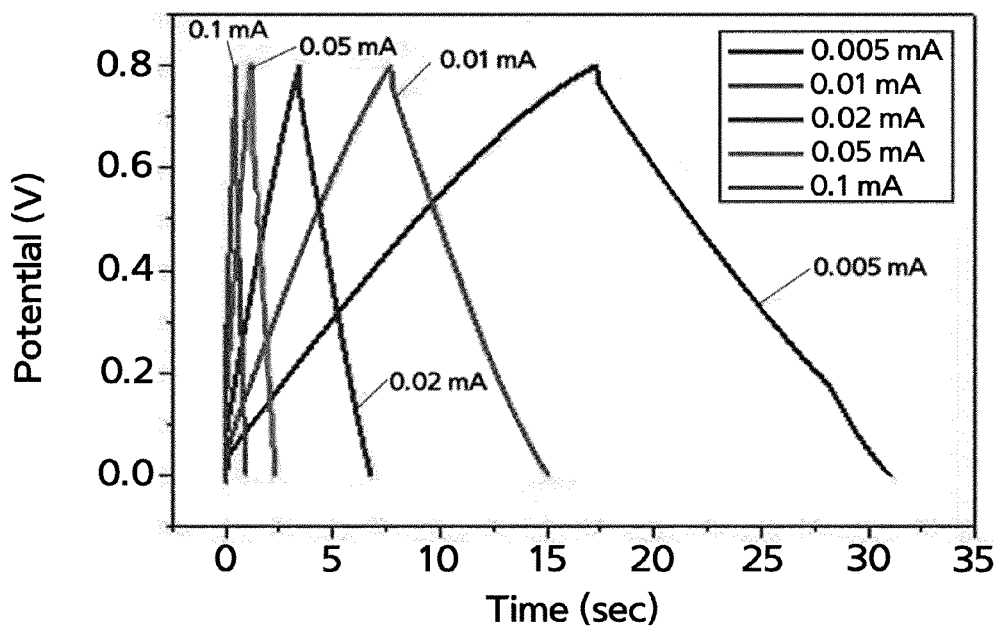

After performing a charge-discharge test in a range of 0 to 0.8 V by chronopotentiometry under a predetermined current ranging from 1 to 5 mA/$cm^2$ in a 0.2 M $Na_2SO_4$ solution, thereby calculating charging capacity values, the calculation results are illustrated in FIG. 23 and FIG. 24.

<Manufacturing Example> Application to a Super Capacitor Electrode

After dipping two strands of the carbon aerogel graphene composite nanofiber manufactured in an embodiment of the present invention in a PVA/$H_2SO_4$ mixed solution to obtain PVA/$H_2SO_4$ mixed solution-coated two strands of the carbon aerogel graphene composite nanofiber, a gel type solid electrolyte layer was formed on the surface of the nanofiber by drying the PVA/$H_2SO_4$ mixed solution-coated two strands of the carbon aerogel graphene composite nanofiber. A fiber type super capacitor was manufactured by bonding respective fibers coated with the solid electrolyte layer in a parallel form.

<Experimental Example> Charge-Discharge and Cyclic Voltammetry Test

Figure 25:
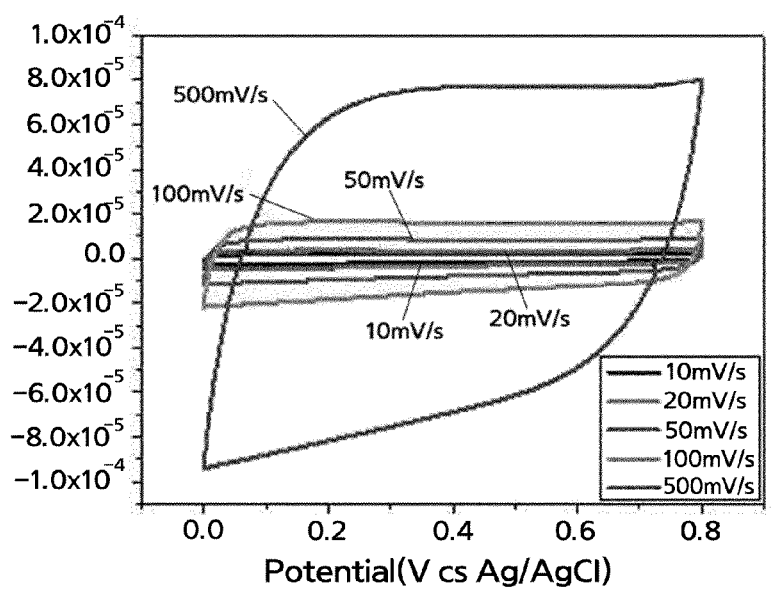
FIG. 25 is a cyclic voltammetry measurement result in a super capacitor including the carbon aerogel graphene composite produced by an embodiment of the present invention.

After performing a charge-discharge test in a range of 0 to 0.8 V by galvanostatic charge-discharge under a predetermined current ranging from 1 to 5 mA/$cm^2$ in a 0.2 M sulfuric acid solution using the same super capacitor electrodes as an anode and a cathode in order to take a full cell electrode test, thereby calculating charging capacity values, the calculation results are illustrated in FIG. 25.

Figure 26:
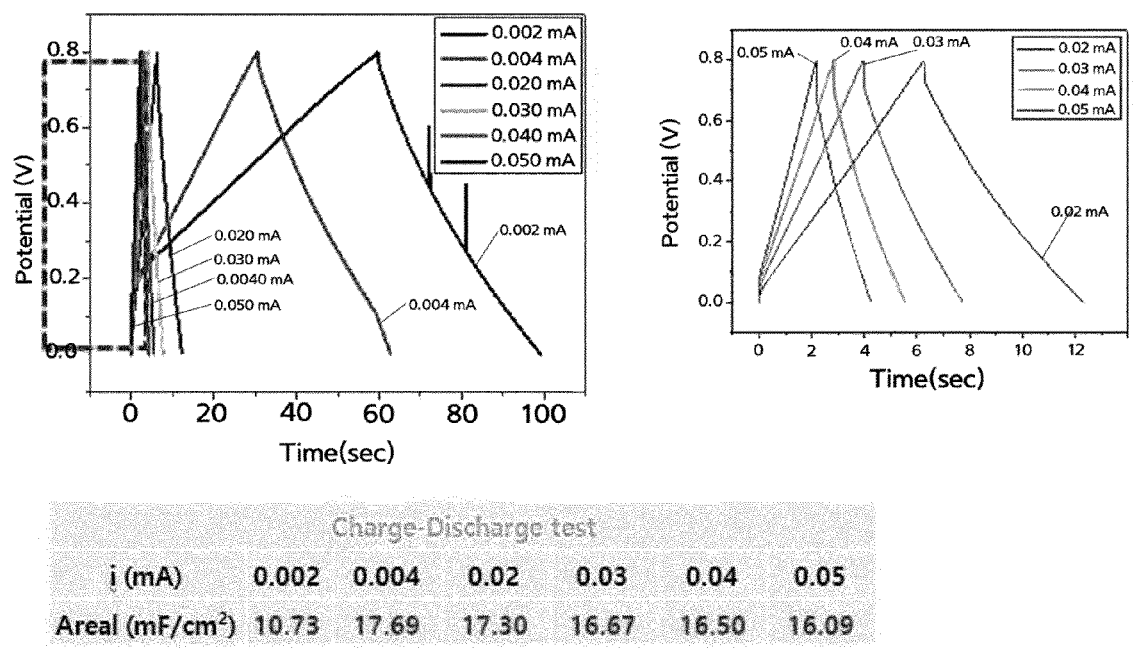
FIG. 26 is a charging capacity measurement result in the super capacitor including the carbon aerogel graphene composite produced by an embodiment of the present invention.

After performing cyclic voltammetry in a range of 0 to 1 V at a scan speed of 1 to 100 mV/s, cyclic voltammetry results are illustrated in FIG. 26.

A method of preparing a carbon aerogel according to the present invention is prepared by mixing the carbon material with the binder, thereby carbonizing a carbon aerogel precursor which can prepare a carbon aerogel although a carbon material of which length and diameter are not adjusted is used. Carbon particles formed on the surface of the carbon aerogel from the binder can adjust pore size distribution by greatly improving specific surface area and conductivity of a carbon aerogel prepared by the present invention and improving porosity of the carbon aerogel.

A carbon aerogel graphene composite according to the present invention has improved tensile strength and electrical conductivity while characteristics of the carbon aerogel and characteristics of the graphene are being combined with each other, and a super capacitor including the carbon aerogel graphene composite according to the present invention exhibits an effect of greatly improving charge and discharge characteristics and lifetime characteristics.

What is claimed is:

1. A method of preparing a carbon aerogel precursor, the method comprising the steps of:
   mixing a carbon material and a dispersant with a solvent to prepare a carbon material dispersion;
   adjusting concentration of the carbon material dispersion;
   mixing a binding agent with the carbon material dispersion to provide a mixed solution;
   dispersing the mixed solution to obtain a gelated mixed solution; and
   dipping the gelated mixed solution in ethanol to remove the dispersant,
   wherein adjusting the concentration of the carbon material dispersion comprises evaporating the solvent, and
   wherein the binding agent is at least one of gelatin, cellulose or chitosan.

2. The method of claim 1, wherein the carbon material is selected from the group consisting of a carbon nanotube, a graphene, an oxide graphene, and a carbon fiber.

3. The method of claim 1, wherein the carbon material has a diameter of 0.8 nm or more and a length of 100 nm or more, and a carbon material dispersion comprising the carbon material has a concentration of 0.001 to 30 wt %.

4. The method of claim 1, wherein the solvent is water or an organic solvent selected from the group consisting of methyl alcohol (MeOH), ethyl alcohol (EtOH), propyl alcohol (PA), isopropyl alcohol (IPA), butyl alcohol, ethylene glycol (EG), 1,2-dichlorobenzene, dimethyl formamide (DMF), dimethyl acetamide (DMAc), methyl ethyl ketone (MEK), methyl isobutyl ketone (MIBK), butyl cellosolve (BC), butyl cellosolve acetate (BCA), n-methyl-2-pyrrolidone (NMP), ethyl acetate (EA), butyl acetate (BA), acetone, cyclohexanone, and toluene.

5. The method of claim 1, wherein the dispersant is an anionic dispersant selected from the group consisting of sodium dodecyl sulfate (SDS), lithium dodecyl sulfate (LDS), sodium dodecyl sulfate (NaDDS), sodium dodecyl sulfonate (SDSA) and sodium dodecylbenzene sulfonate (SDBS) that are alkyl sulfate-based compounds, or a cationic dispersant selected from the group consisting of cetyltrimethyl ammonium chloride (CTAC), cetyltrimethyl ammonium bromide (CTAB), and dodecyl-trimethyl ammonium bromide (DTAB), or a nonionic dispersant selected from the group consisting of glycerol monostearate, sorbitan monooleate, polyvinyl alcohol (PVA), polymethyl acrylate (PMA), methyl cellulose (MC), carboxyl methyl cellulose (CMC), Gum Arabic (GA), polysaccharide, polyethyleneimine (PEI), polyvinylpyrrolidone (PVP), and polyethylene oxide (PEO)-poly(ethylene oxide)-poly(butylene oxide) terpolymer.

6. The method of claim 1, wherein the binding agent is mixed in an amount of 50 to 300 parts by weight per the total weight of the carbon material dispersion of 100 parts by weight.

7. The method of claim 1, wherein the binding agent has a carbon yield upon carbonization of 5 to 40%.

8. The method of claim 1, wherein the step of mixing the binding agent with the carbon material dispersion further comprises additionally mixing a carbon precursor with the binding agent and the carbon material dispersion.

9. The method of claim 8, wherein the carbon precursor is selected from the group consisting of (i) a saccharide selected from the group consisting of a monosaccharide, a disaccharide, an oligosaccharide, derivatives thereof, and a random combination thereof, (ii) a polymer carbohydrate, derivatives of the polymer carbohydrate, a non-carbohydrate synthetic polymer or a random combination thereof, and polydopamine.

10. The method of claim 8, wherein the carbon precursor is a monosaccharide selected from the group consisting of glucose, fructose, hydrates thereof, syrups thereof, and combinations thereof.

11. The method of claim 8, wherein the carbon precursor is a polysaccharide selected from the group consisting of maltose, sucrose, hydrates thereof, syrups thereof, and combinations thereof.

12. A method of preparing a carbon aerogel, the method comprising the steps of:
preparing a carbon material dispersion by mixing a carbon material and a dispersant with a solvent;
adjusting concentration of the carbon material dispersion;
providing a mixed solution by mixing a binding agent with the carbon material dispersion;
obtaining a gelated carbon aerogel precursor by dispersing the mixed solution;
removing the dispersant and obtaining a dispersant-removed carbon aerogel precursor by dipping the gelated carbon aerogel precursor in ethanol; and
obtaining a dried carbon aerogel by drying the dispersant-removed carbon aerogel precursor.

13. The method of claim 12, further comprising the step of carbonizing the carbon material and the binding agent by heat-treating the carbon aerogel dried in the step of drying the dispersant-removed carbon aerogel precursor.

14. A method of producing a carbon aerogel graphene composite, the method comprising the steps of:
preparing a carbon material dispersion by mixing a carbon material and a dispersant with a solvent;
providing a mixed solution by mixing a binding agent with the carbon material dispersion;
obtaining a gelated carbon aerogel precursor by dispersing the mixed solution;
mixing a graphene oxide with the gelated carbon aerogel precursor to prepare a mixed solution;
performing a spinning process of the mixed solution, thereby spinning the mixed solution to manufacture a nanofiber; and
heat-treating the nanofiber.

15. The method of claim 14, further comprising the step of adjusting concentration of the carbon material dispersion before the step of providing a mixed solution by mixing a binding agent with the carbon material dispersion.

16. The method of claim 14, further comprising the step of removing the dispersant and obtaining a dispersant-removed carbon aerogel precursor by dipping the gelated carbon aerogel precursor in ethanol before the step of mixing a graphene oxide with the carbon aerogel precursor to prepare a mixed solution.

17. The method of claim 14, wherein the binding agent has a carbon yield upon carbonization of 5 to 40% during carbonization.

18. The method of claim 14, wherein the carbon precursor is additionally mixed in an amount ratio of 0.1 to 1,000 parts by weight per 100 parts by weight of the carbon material dispersion in the step of providing a mixed solution by mixing a binding agent with the carbon material dispersion.

* * * * *